UNITED STATES PATENT OFFICE 2,683,643

PROCESS OF DYEING AND PRINTING AND COMPOSITION THEREFOR

Fritz Baumann, Berthold Bienert, and Georg Rösch, Leverkusen, Germany, assignors to Farbenfabriken Bayer Aktiengesellschaft, Leverkusen, Germany, a corporation of Germany No Drawing. Application August 21, 1950, Serial No. 180,695

Claims priority, application Great Britain August 25, 1949

20 Claims. (Cl. 8—1)

The present invention relates to a new process of dyeing and printing substrata with phthalocyanines.

It is an object of the present invention to provide a new process of producing dyestuffs on substrata.

Another object of the invention is to provide a new process for producing phthalocyanines on organic substrata under conditions which do not affect these substrata.

A further object of the invention is to provide a new process of producing decorated textile materials with especially excellent fastness properties and beautiful shades.

A still further object of the invention is to provide a new process for the production of multi-colored prints from the blue to green phthalocyanine-dyestuffs in combination with the known dyestuffs which are developed on the fiber from their components printed thereon.

Other objects and features of this invention will become apparent as the following description proceeds.

According to the new invention 3-imino-isoindolenines substituted in 1-position are applied to the fiber and treated at elevated temperatures, preferably in the presence of reducing agents. For producing metal-containing phthalocyanines on the fiber there are used 3-imino-isoindolenines containing heavy metals capable of forming phthalocyanines in a combined state or other compounds of these heavy metals are added to said 3-imino-isoindolenines. Sometimes it may be of advantage to accomplish the formation of dyestuff in the presence of ammonia or derivatives thereof. Dyestuff formation on the fiber from said imino-isoindolenines may be accomplished by heating or by steaming, if desired, in the presence of dilute acids.

I. *The 3-imino-isoindolenines.*—Suitable 3-imino-isoindolenines for carrying out the new process are those of the following general formula:

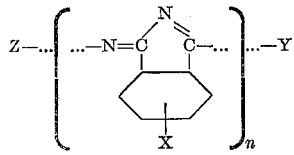

wherein $n$ stands for a whole number from 1 to about 6, and Z stands for hydrogen, and Y for —$OR_1$, —SH,

whereby $R_1$ may be an alkyl group, for instance methyl, ethyl, propyl, butyl, pentyl, cyclohexyl, and $R_2+R_3$ may be hydrogen, alkyl, aryl, cycloalkyl; these hydrocarbon groups may be substituted. As examples of suitable substituents there may be mentioned the following organic radicals: The radicals of acetic acid, formic acid and other organic acids, alkyl groups, such as methyl, ethyl, propyl, butyl, pentyl, etc., cyclohexyl, aryl groups, such as phenyl, substituted phenyl, naphthyl, anthraquinonyl, etc., and $NH_2CO$—, as well as substituted derivatives thereof, such as for instance, $HOCH_2CH_2$—, $CH_3COOCH_2CH_2$—, o-$C_6H_{11}OC_3H_6$—, o-$CH_3OC_6H_4$—, m-$CH_3OC_6H_4$—, p-$CH_3OC_6H_4$—, o-$ClC_6H_4$—, m-$ClC_6H_4$—, p-$ClC_6H_4$—, p-$O_2NC_6H_4$— p-$C_2H_5OOC.C_6H_4$—, p-$H_2NSO_2C_6H_4$— m-$H_2N.C_6H_4$—, p-$H_2N.C_6H_4$—, p-$HO.C_6H_4$. If $n$ is an integer from 4 to 6, Z+Y may stand for a single linkage between the C-atom standing in 1-position of one molecule of 3-imino-isoindolenine and the nitrogen linked in 3-position of another molecule of 3-imino-isoindolenine. X may be one or more organic or inorganic substituents, such as for instance methyl, ethyl, propyl, butyl, cyclohexyl, substituted cyclohexyl, phenyl, naphthyl, pyridyl, bromine, chlorine, sulfonic acid, carbonyl, methoxy, ethoxy, butoxy, cyclohexoxy, phenoxy, $CH_3S$—, $C_2H_5S$—, $C_6H_5S$—, $ArSO_2$—, Ar standing for an aromatic radical, and the corresponding substituted derivatives of these radicals. Anellated nuclei may also be named as substituents. Furthermore, one or more carbon atoms may be substituted by hetero atoms, for instance, nitrogen.

Furthermore, the above described compounds may contain water, alcohol or also other organic molecules as addition, the number of which being generally not greater than $n$. They may further contain metals, for instance, alkali metals, alkaline-earth metals or heavy metals. No particulars can definitely be given as to the kind of linkage of the metals. Presumably various kinds of linkages are to be found. For instance, the metal may be directly bound to the nitrogen or may also be linked in a complex state. However, also both kinds of linkage may simultaneously exist. Complex-linked heavy metals will especially be present if $n$ is an integer from 4 to 6. Besides the said organic molecules and the metals the compounds may further contain anions in a combined state, viz. anions of inorganic acids, such as for instance, of nitric acid, sulfuric acid, hydrochloric acid, carbonic acid, as well as anions of organic acids, such as for instance, of acetic acid, formic acid, propionic acid, benzoic acid etc., whereby the number of these anions may be one or more depending on the size of the molecule and the conditions applied during their production.

*The 1-amino-3-imino-isoindolenines.*—The 1-amino-3-imino-isoindolenines according to the present invention may be substituted as already mentioned above in the carbocyclic ring by one or more radicals or atoms which may stand in the most various free positions. Depending on which starting material has been used various substituents may simultaneously be present. Compounds containing only one or also two substituents have been observed regardless which substituents are present. However, in some cases the compounds contain also three or four substituents. As substituents may be mentioned: methyl, ethyl, propyl, butyl, cyclohexyl, substituted cyclohexyl, phenyl, naphthyl, pyridyl, bromine, chlorine, sulfonic acid, carbonyl, methoxy, ethoxy, butoxy, cyclohexoxy, phenoxy, $CH_3S$—, $C_2H_5S$—, $C_6H_5S$—, $ArSO_2$—, Ar standing for an aromatic radical, and the corresponding substituted derivatives of these radicals. The compounds may also carry anellated aromatic or heterocyclic nuclei.

Besides the above-said nuclear substituents the compounds may carry at the nitrogen of the amino group the most various organic substituents, such as for instance, the radicals of acetic acid, formic acid and other organic acids, alkyl groups, such as methyl, ethyl, propyl, butyl, pentyl etc., cyclohexyl, aryl groups, such as phenyl, substituted phenyl, naphthyl, anthraquinonyl, and $NH_2CO$—, as well as substituted derivatives thereof, such as for instance, $HOCH_2CH_2$—, $CH_3COOCH_2CH_2$—, $o-C_6H_{11}OC_3H_6$—, $o-CH_3OC_6H_4$—

$m-CH_3OC_6H_4$—, $p-CH_3OC_6H_4$—, $o-ClC_6H_4$—, $m-ClC_6H_4$—, $p-ClC_6H_4$—, $p-O_2NC_6H_4$—, $p-C_2H_5OOC.C_6H_4$—

$p-H_2NSO_2C_6H_4$—, $m-H_2N.C_6H_4$—, $p-H_2N.C_6H_4$—, $p-HO.C_6H_4$.

Only those 1-amino-3-imino-isoindolenines are suited for carrying out the new process which are not substituted in the imino group. Substituents in the amino group, however, do not prevent the formation of phthalocyanines.

The new 1-amino-3-imino-isoindolenines—as far as they contain in the amino group an active hydrogen atom in a combined state—may be present in their tautomeric forms, i. e. a hydrogen atom is attached to the nitrogen bridge; in this case the 1-amino-3-imino-isoindolenines show the constitution of the corresponding di-imino-imides. In some cases, however, other tautomeric forms may also be present.

Suitable compounds are, for instance, the 1-amino-3-imino-isoindolenines, i. e. such compounds wherein Y of the above general formula stands for

Such 1-amino-3-imino-isoindolenines are obtained, for instance:

(a) By heating o-arylene dicarboxylic acids, their nuclear substitution products or functional derivatives thereof in the presence of substances giving off ammonia under the reaction conditions, for instance urea, as well as in the presence of preferably at least equimolar amounts of anions which are stable under the reaction temperatures, whereby preferably nitrate ions are used and in case functional derivatives of o-arylene dicarboxylic acids containing carbonyl groups or these acids are used as reactants, in the presence of catalysts promoting formation of phthalocyanine from o-arylene dicarboxylic acids and, if desired, in the presence of indifferent solvents, to temperatures of about 200° C., or (b) By adding ammonia or its derivatives to o-arylene dinitriles or the functional derivatives of o-dicarboxylic acids being free from carbonyl groups which may contain hetero atoms in the aromatic ring or to the nuclear substitution products thereof, if desired, in the presence of solvents and/or catalysts and/or under pressure, or (c) By producing the yellow to red colored complex compounds containing copper from o-arylene dicarboxylic acids, which may also contain hetero atoms in the aromatic nucleus, or their nuclear substitution products capable of forming phthalocyanine or their functional derivatives, which comprises heating said o-arylene compounds with copper salts and substances giving off ammonia. Thereupon the complex compounds thus obtained which contain more than one atom of copper per one o-arylene radical, are treated with agents capable of dissolving monovalent copper directly or after converting same into the bivalent state. The treatment of the said complex compounds is preferably effected with nitric acid whereby during this treatment or subsequently anions are advantageously added which yield difficultly soluble salts with the amino-imino-isoindolenines obtained according to the present invention.

The mode of production, properties etc. of these compounds have been disclosed in the co-pending application Ser. No. 180,696 of even date relating to "New Intermediate Products."

*The monomeric 1-alkoxy-3-imino-isoindolenines.*—Compounds wherein Y in the above general formula stands for $-OR_1$ are, for instance, the monomeric 1-alkoxy-3-imino-isoindolenines which are obtained by treating o-arylene dinitriles or their nuclear substitution products capable of forming phthalocyanine in alcohols or in mixtures of alcohols with other solvents with at least about the equimolar quantity of alkali metal alcoholates or substances acting as alkali metal alcoholates and isolating the crystalline products precipitating already during reaction or after cooling by conventional methods.

Their mode of production and properties have been described sub (A) in the following.

However, if $n$ is greater than one the products may be used which are obtained, for instance, according to Linstead and Lowe (Journal of the Chemical Society, London, 1934, page 1026) from phthalonitrile by reaction of alkali metal alcoholates in alcoholic solution as well as the compounds described sub (B) in the following which are obtained by reacting upon o-dinitriles alkali metal alcoholates or substances acting as alkali metal alcoholates in the presence of alcohols whereby preferably smaller quantities than equimolar ones of the alkali metal alcoholates are used and, if desired, indifferent solvents are added, and precipitating the alkoxy-imino-isoindolenine compounds dissolved in the reaction solution in form of their alkali metal salts, after having converted them, if necessary, into their metal-free compounds by means of acids, by the addition of solvents reducing the solubility of the alkoxy compounds or their alkali metal salts respectively or in case indifferent solvents were used during their production, by removing the readily dissolving components and by isolating the precipitate in known manner.

*The polyisoindolenines.*—If the compounds contain heavy metals the heavy metal-containing condensed 3-imino-isoindolenines may be used which are obtained:

(a) By causing copper salts in organic solvents to react upon o-arylene dinitriles under more gentle conditions than those customarily applied in the production of phthalocyanine, and isolating the products thus formed;

(b) By reacting 1-amino-3-imino-isoindolenines and ammonia with soluble heavy metal compounds and isolating the slightly soluble, higher molecular metal-amino-imino-isoindolenines formed;

(c) By reacting, for instance, the condensed 1-alkoxy-3-imino-isoindolenines with soluble heavy metal compounds, preferably in organic solvents, and precipitating the heavy metal compounds thus formed with the addition of substances reducing their solubility;

(d) By reacting concentrated nitric acid upon metal phthalocyanines suspended in organic solvents and treating the primarily formed compounds with basic substances;

(e) By reacting bromine upon phthalocyanine in the presence of an alcohol and treating the primarily formed bromine-addition-products with bases;

(f) By reacting nitrates of amino-imino-isoindolenines upon metal phthalocyanines in the presence of indifferent solvents at higher temperatures.

Their mode of production and their properties are described sub (C) in the following.

*Other compounds.*—Furthermore, the insoluble copper complex compounds may be used which are obtained by heating phthalonitrile and cuprous halides in the presence of urea and formamide as is described, for instance, in FIAT Final Report 1313, vol. III, pages 342, 344, 345, as well as the insoluble copper compounds obtainable according to similar processes also from other arylene dicarboxylic acids or functional derivatives thereof, which are disclosed in the copending application Ser. No. 130,696 of even date relating to "New Intermediate Products."

It is not absolutely necessary to charge the said imino-isoindolenines for carrying out the reaction, however, also compounds may be used which are converted into imino-isoindolenines under the reaction conditions applied for the development of the phthalocyanine dyestuff. Such compounds are, for instance, the products according to Pinner ("Die Imidoäther und ihre Derivate," Berlin, 1892) which are obtained by reacting aromatic o-dinitriles in alcohols with hydrochloric acid and subsequent treatment with ammonia. Suitable starting materials for the process according to the invention are also o-arylene dinitriles as far as they are used in combination with one of the above-said imino-isoindolenine compounds. Furthermore, a mercapto compound may be mentioned which has been described as o-cyano-benzamide and was obtained by Porter, Robinson and Wyler (Journal of the Chemical Society, 1941, page 620) as sodium sulfhydrate and phthalonitrile. The same compound may also be prepared by reacting anhydrous sodium sulfide upon phthalonitrile in methanol. The products obtained according to the said two processes are presumably 1-mercapto-3-imino-isoindolenines which may be converted into phthalocyanines under controlled conditions, for instance, in the presence of ammonia or amines.

A closed ring of four or more imino-isoindolenine molecules probably exists in the 3-imino-isoindolenine compounds wherein $Z+Y$ stand for a single linkage between the carbon standing in 1-postion and the nitrogen bound in 3-position of another imino-isodolenine molecule. These compounds are nevertheless no phthalocyanines but compounds having two hydrogen atoms less than those and which, therefore, may be designated as dehydro-phthalocyanine provided that they consist of 4 molecules of imino-isoindolenine. Due to this lower content of two atoms of hydrogen these compounds are only weakly colored. The compounds are more or less difficultly soluble depending on whether they contain solubilizing groups, for instance, alkoxy groups originating from alcohol added.

II. *The process of dyeing and printing.*—For the production of phthalocyanines on the fiber from said imino-isoindolenines at temperatures which do not tender the fiber, the addition of reducing agents is generally necessary. The term "reducing agents" in this connection shall not be restricted to such substances as are generally used as reducing agents but shall comprise quite generally compounds which are capable under the reaction conditions of yielding two hydrogen equivalents required for the production of phthalocyanines. Compounds promoting dyestuff formation are, for instance, monovalent alcohols as far as they do not volatilize too fast at the temperatures applied for development as mostly do lower aliphatic alcohols, such as methanol and ethanol. Further suitable compounds are polyvalent alcohols, for instance, glycol, glycerol, mannite, sorbite, pentaerythrite or also formic acid or other reducing acids and functional derivatives thereof, for instance, ammonium formate, formamide and the substituted formamides. Other suitable substances are hydroxy- and polyhydroxy acids, for instance, lactic acid, tartaric acid and its derivatives, such as diethyl tartrate, saccharic acid, furthermore, organic sulfinic acids, for instance, ethane sulfinic acid, and also amino-hydroxy compounds, such as amino alcohols. Suitable inorganic agents are particularly compounds of metals wherein the metals are present in a lower valency. Stronger reducing agents may readily split off the bound metal in elementary form. Therefore, such reducing agents are only applied if amino-imino-isoindolenine compounds containing the metal firmly linked are used as starting materials or if mixtures of heavy metal compounds and imino-isoindolenine are employed which yield such stable metal imino-isoindolenine compounds on making the dyeing solutions or printing pastes. In this case, for instance, reducing sugars, alkali-hydrosulfites, alkali-bisulfites, aldehydes or ketones and their bisulfite addition products, soluble sulfides, hydrogen sulfide, hydrazine, semicarbazide, hydroxylamine may be used as reducing agents. It is possible to add either one of said reducing agents alone or also mixtures of two or more of these reducing agents in quantities equivalent to those of the intermediate products or still better in excess which may amount to the multiple.

If the 3-imino-isoindolenines used for printing and dyeing do not contain the metal, the corresponding metal has to be added for effecting the formation of metal phthalocyanines on the fiber. The metals may be added either in form of their salts to the dyeing solutions or printing pastes or they may be applied to the fiber before or after the application of the imino-isoindolenines.

The proportions of ingredients charged depend in the first line on the reaction conditions applied for development of the dyestuff. One mol of the metal compound per 4 to 6 moles of a monomeric imino-isoindolenine may generally advantageously be used. However, on processing with solutions containing a larger quantity of water, it may be of advantage to use a minor quantity of metal.

When carrying out the new process with imino-isoindolenines containing the metal in a combined state, it may be of advantage to apply these imino-isoindolenines, if they contain more than one atom of metal per 4 to 6 iso-indolenine radicals, in combination with an appropriate amount of a metal-free imino-isoindolenine compound. In this manner imino-isoindolenine compounds may be applied to the fiber which as such are insoluble in the solvent employed. In many cases, a more or less big quantity of the imino-isoindolenine compounds may be replaced by the corresponding o-arylene dinitrile which is used for the formation of the dyestuffs in combination with the imino-isoindolenine molecules under the conditions applied for development of the dyestuffs.

Suitable metals for the process according to this invention are those capable of forming phthalocyanines regardless as to whether they are separately added in form of their salts or whether they are applied in form of the imino-isoindolenine metal compounds. There may be mentioned, for instance, copper, cobalt, nickel, iron, magnesium, zinc, tin, lead, aluminum, chrome and titanium. When using the anions in form of their salts the formation of dyestuff is generally not effected to a material extent. For the production of phthalocyanines on the fiber, however, some anions, for instance, those of the halogen hydracids or of the organic carboxylic acids have proved to be especially suitable.

For developing the dyestuff on the fiber from the intermediate products it may be of advantage to add ammonia or derivatives thereof, especially when using alkoxy-imino-isoindolenines which are poorer in nitrogen. By the addition of these substances fixation and fastness to rubbing of the dyeing are improved and, simultaneously, a more favourable use of the intermediates is achieved. For this purpose ammonia is suitable in any case; furthermore, there may be used primary or secondary amines whereby the substituents may be alkyl, cycloalkyl, aryl and aralkyl groups which may contain hydroxy, mercapto, carboxyl and sulfo groups. Especially suitable are also tertiary amines, such as triisopropyl-amine and triethanol-amine. Diamines or polyamines, amino alcohols etc. show useful effects too. The latter compounds may exhibit a reducing action besides the function of ammonia. The development of the dyestuff on the fiber from the intermediate products and the said additions applied thereto is preferably accomplished by the action of heat. Processing may be carried out, for instance, by drying the moist fibers and developing the dyestuff at temperatures of about 100 to 120° C. Lower temperatures will also do if heating is performed for a comparatively longer time whereas still higher temperatures—as far as they do not affect the fiber—shorten the developing time. At the usually applied temperatures of 100 to 120° C. dyestuff formation is generally completed already within 10 minutes. As a matter of fact, the developing time further depends on the properties of the reducing agent or the mixtures thereof applied. The dyestuff may also be developed on the fiber at lower temperatures under the influence of sunlight or artificial light sources.

The dyestuff may also be produced by the action of direct wet or dry steam as is usually done on developing the known printing dyestuffs. Acid steam, i. e. steam containing organic acids, e. g. formic acid or acetic acid, as is usually employed on developing azo dyestuffs from diazoamino compounds and coupling components, yields similar results.

Dyeing may be accomplished on cotton, wool and silk as well as on artificial silk or staple fiber, polyamide and other synthetic fibers. Also paper and other vegetable fibers may be dyed according to this invention whereby the developing process is adapted to the character of the fibrous material used.

The application of the dyestuff to the fiber may be accomplished principally by three methods, viz. by printing, padding and dyeing. Printing, for instance, may be performed by stirring the imino-isoindolenine derivatives or their metal compounds or also both in combination, if necessary, together with metal salts and with ammonia or amines or ammonium salts, into a paste while adding one or more of the above-said reducing agents. On using other printing pastes, especially those containing alkoxy-imino-isoindolenines which are poorer in nitrogen, it may be of advantage to dissolve the latter in alcohol and to heat them together with basic products and with ammonium salts and/or ammonia, amines etc. for a short time, to keep them at room temperature for some time and subsequently to stir the mixture thus obtained together with the metal salts and the said reducing agents into a paste, for instance, a tragacanth thickening.

In many cases, water containing smaller or larger amounts of water-miscible, organic solvents or solvent mixtures, may be used as solvent. Of course, prints may also be obtained on working in organic solvents only, for instance, in formamide, dimethyl formamide, pyridine, glycerol or glycol. The said printing pastes are applied to the fiber by conventional methods and, if necessary, after previously drying the printed fibers are subjected to heat treatment or to the action of direct neutral or acid steam. The formation of phthalocyanine dyestuffs on the fiber may also be accomplished by means of strong light sources. In most cases the prints produced according to the aforesaid treatment already show the shade of the phthalocyanine in question. However, by the above treatment some printing pastes initially yield intermediate products fixed to the fiber which are converted into phthalocyanine preferably by treatment with dilute acids, such as formic acid, oxalic acid and sulfuric acid before the usual soaping. A modification of the process according to the present invention consists in soaking the fibrous material with the metal salt solution, drying, if necessary, and then printing the metal-free paste or vice versa.

The condensed 1-alkoxy-3-imino-isoindolenines.—Processing on printing according to the present invention substantially corresponds to the usual methods with the known developing dyestuffs so that the new intermediates may be applied without difficulty together with the known developing dyestuffs, for instance, in multi-color printing. Some of the said new intermediates may be printed in admixture with other known developing dyestuffs so as to allow the production of—besides the green to blue dyeings of phthalocyanines—also any other desired combination color obtainable therefrom.

The content of the new intermediate products in the printing pastes may be varied depending upon the depth of color desired.

A further modification of the printing process according to the present invention consists in directly using the solutions or reaction mixtures obtained according to the processes described below, especially sub (A) and (B) for producing the printing pastes without previously isolating the 3-imino-isoindolenines.

The new intermediate products are distinguished by a good affinity to the fiber so that they may be used for dyeing from the liquor. For this purpose, after dissolving them in suitable solvents, such as for instances, in alcohols, formamide or water, the said reducing agents and, if necessary, metal compounds are added to the concentrated solutions obtained which are diluted with water. Dyeing from the liquors thus obtained is preferably done at moderately raised temperatures (up to 50° C.), the material is squeezed off and, if necessary, pre-dried and the dyestuff is developed at higher temperatures or in direct steam as described above. The concentration of the intermediate products in the liquor may be varied in wide limits depending on the depth of color desired. Also tannin-treated cotton may be dyed in this manner.

Padding is carried out in the usual manner with concentrated solutions or fine suspensions of the intermediate products containing the metal required and the reducing agents and, if necessary, thickenings. The drying and developing processes resemble those described for printing and dyeing.

Resists may be produced on padded materials, for instance, by printing before development of the dyestuff discharge pastes containing strong acids, for instance, oxalic acid, or strong alkalies, for instance, alkali hydroxides, or strong organic bases, for instance, hexamethylene-tetramine, in addition to the usual additives.

The dyeings produced according to the present invention on the said fibrous materials are distinguished by special brilliancy, fastness to light and rubbing and by excellent fastness to wet processing.

The outstanding practical importance of the new process of dyeing and printing resides in the fact that this invention allows the production of cobalt phthalocyanine on substrata and particularly on the fiber. The phthalocyanines have hitherto gained practical importance only as pigment dyestuffs, as direct cotton dyestuffs in form of their sulfonic acids and as dyestuffs for lacemaking. It has been tried since long to produce phthalocyanines on the fiber in order to utilize the excellent fastness properties of the unsulfonated phthalocyanines for dyeing and printing. However, all experiments have failed as yet since the formation of phthalocyanine from the components can only be effected at higher temperatures. On applying the above-said imino-isoindolenine compounds, however, the conditions under which the production of phthalocyanines is accomplished can be so adapted without difficulty that textile materials are not affected. For this purpose, any modifications of the processing methods may be chosen which render possible the development of the dyestuff from the complex cobalt compounds at temperatures of up to about 100° C.

(A) *The production of monomeric 1-alkoxy-3-imino-isoindolenines.*—The production of the 3-imino-isoindolenines substituted in 1-position can be accomplished according to various methods. Imino-indolenines carrying an —$OR_1$-group in 1-position and wherein $n=1$ (cf. the above general formula) may be produced, for instance, by treating o-arylene dinitriles or their nuclear substitution products capable of forming phthalocyanines in alcohols or in mixtures of alcohols with other solvents with preferably equimolar quantities of alkali metal alcoholates or substances acting as alkali metal alcoholates and isolating the crystalline products precipitating already during reaction or after cooling by conventional methods.

The new compounds are derivatives of the isoindolenine:

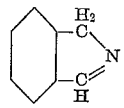

wherein the hydrogen standing in 1-position is substituted by an alkoxy group and the hydrogen standing in 3-position by an imino group. Therefore, the compounds are believed to have the constitution of 1-alkoxy-3-imino-isoindolenine:

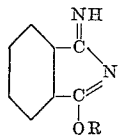

They may further contain 1 mol of alcohol in addition to the double bond of the heterocyclic ring as an addition.

Suitable starting materials for the production of 1-alkoxy-3-imino-isoindolenines according to the present invention are phthalonitrile and, furthermore, 1.2.4.5 - tetracyanobenzene, o-cyanobenzimino ether, alkyl substituted phthalonitrile, for instance, 4-methylphthalonitrile and 4-tertiary-butyl-phthalonitrile, 3.4-dicyano-diphenyl as well as phthalonitrile substituted by alkoxy-, phenoxy-, sulfonic acid groups and halogen. As polynuclear dinitriles may be mentioned naphtalene-2.3-dinitrile and as heterocyclic dinitrile dicyano-pyridine-2.3. Also diphenyl maleic acid dinitrile which in this case is to be regarded as an aromatic system, may be used as starting material for this reaction. Furthermore, o-dinitriles may find application which are substituted in the nucleus by one or more $CH_3S$—, $C_2H_5S$—, $C_6H_5S$—, ArO—, ArS—. It is to be understood that all dinitriles or functional derivatives of o-dicarboxylic acids being free from carbonyl groups which are known as starting materials in the production of phthalocyanines may also be used for producing the new intermediates according to the present invention.

Suitable alkali metal alcoholates are, for instance, those of sodium, potassium, lithium whereby the alcohol component may consist of monovalent alcohols, such as methyl, ethyl, isopropyl, butyl alcohol or also of higher alcohols. The same effect is attained when using the alcoholates of polyvalent alcohols, for instance, of glycol, or of glycerol. Of course, the alkali metal alcoholates may be replaced by substances acting as the said alcoholates. A solution of sodium amide in a monovalent low alcohol may be mentioned as example. Also solutions of alkali hydroxides in alcohols may be used for accomplishing the present reaction. It is not absolutely necessary to charge ready-made alcoholates but also the alkali metal may be introduced into the alcoholic solution of the o-arylene dinitrile.

The monomeric alkoxy-imino-isoindolenines formed during reaction show the tendency as is set forth below to condense with each other while alcohol is split off. Condensation can be prevented by taking care that sufficient quantities of activated alkoxy groups are present. Hence it follows that the amount of the above-said alcoholates or other substances which may be used instead of such alcoholates required for carrying out the reaction, must not be too small. Generally not less than one mol of the alcoholate or substances acting as alcoholates calculated on the o-arylene dinitrile charged is to be used. Sometimes it may be of advantage to use more than 1 mol of the alcoholate. However, in some cases good results are also obtained with smaller quantities of the alcoholate.

The reaction may be carried out in the presence of a further solvent. Suitable solvents are, for instance, benzene, toluene or also aliphatic hydrocarbons, chloroform, dioxane, liquid ammonia. In this case, it is of particular advantage to process with the above-said larger quantities of alcoholates. Liquid ammonia to be used in combination with the alkali metal alcoholates has proved to be a particularly valuable solvent for accomplishing the present invention. Liquid ammonia displays the advantage that the reaction is achieved therein at a very high speed and very pure reaction products which can easily be isolated are obtained in a good yield. Irrespective of which of the solvents or solvent mixtures are used, care has to be taken that processing is performed as far as possible in the absence of water since water exhibits a saponification effect upon the alkoxy-imino-isoindolenines which probably results in the formation of the corresponding compounds substituted in 1-position by a hydroxy group which represent in their tautomeric form the imino-arylene-dicarboxylic acid-imides. Imino-arylene-dicarboxylic acid-imide is not capable of reacting with the alcoholates to form the alkoxy compounds. Therefore, the performance of this reaction in the presence of water represents a process of producing mono-imino-arylene-dicarboxylic acid-imides from o-arylene-dinitriles in a good yield.

The o-arylene-dinitriles react with the alcoholates while heat is set free. Therefore, after completion of the reaction the mixture is preferably cooled to low temperatures, for instance, to $-20°$ C. since the condensation of the monomeric products is promoted at higher temperatures. The monomeric metal-free compounds precipitate on cooling from the solution in form of colorless to weakly yellow colored crystals which contain no alkali metal. They are strongly basic and represent relatively stable compounds. They may be cautiously recrystallized from alcohols. They are easily soluble in aqueous solutions of organic acids and may be precipitated again from these solutions in crystalline form by means of weak alkalies if the reaction is carried out in the cold and the acid is not allowed to act for a longer time. On longer standing in acid aqueous solutions, especially in dilute mineral acids or on heating, the compounds are saponified with the formation of the corresponding mono-imino-arylene-dicarboxylic acid-imides or of arylene dicarboxylic acid-imides. Alkali salts being easily soluble in alcohol are obtained from these compounds in concentrated alcoholic solutions of alkali metal alcoholates. On diluting the solutions with alcohols or water the alkali salts are very readily liable to alcoholysis and hydrolysis with the reformation of the starting material. Furthermore, as already mentioned above, these salts show the tendency to condense while splitting off alcohol—which may be received on determining the melting point—whereby at last a green-yellow melt remains behind. By rapidly heating the decomposition temperatures are at about 130° C. The action of light may also lead to slow decomposition.

The new monomeric intermediate products are extraordinarily reactive substances wherein the alkoxy group as well as the imino group are very mobile. Thus, for instance, the alkoxy group may be replaced by an amino group without difficulty as is described in the copending Application Ser. No. 180,696 of even date relating to "New Intermediate Products."

The primarily formed monomeric mono-alkoxy compounds—provided that compounds of lower monovalent alcohols are concerned—generally add a further molecule of alcohol and are obtained after isolation as dialkoxy compounds. The second alkoxy group probably stands either in 1-position with the formation of acetales or also in 3-position. The hydrogen of alcohol enters into the adjacent nitrogen atom.

The new products according to the present invention are valuable intermediate products in the organic-chemical synthesis.

(B) *The production of condensed 1-alkoxy-3-imino-isoindolenines.*—Condensed alkoxy-imino-isoindolenines, i. e. imino-isoindolenines substituted in 1-position by an —$OR_1$-group and wherein $n$ of the above general formula is greater than one may be obtained by reacting upon o-dinitriles alkali metal alcoholates or substances acting as alkali metal alcoholates in the presence of alcohols whereby preferably smaller quantities than equimolar ones of the alkali metal alcoholates are used and, if desired, indifferent solvents are added, and precipitating the alkoxy-imino-isoindolenine compounds dissolved in the reaction solution in form of their alkali metal salts, after converting them, if necessary, into their metal-free compounds by means of acids, by the addition of solvents reducing the solubility of the alkoxy compounds or their alkali metal salts respectively or in case indifferent solvents were used during their production, by removing the readily dissolving components and by isolating the precipitate in known manner.

The production of condensed alkoxy-imino-isoindolenines may be accomplished according to processes similar to those described above sub (A).

It has now been found that condensed alkoxy compounds are principally or exclusively obtained if the process is carried out in accordance with at least one of the following conditions:

(1) Using the alkali metal alcoholates in smaller quantities than the equimolar ones whereby often $\frac{1}{10}$ mol of the alkali metal alcoholate per 1 mol of arylene dinitrile is already sufficient to accomplish the reaction, (2) Heating to higher temperatures, however, care having to be taken that the temperature does not raise too high in order to avoid partial decomposition involving a reduction of the yield or formation of phthalocyanines, (3) Processing in indifferent solvents or in mixtures of such solvents with alcohols. As indifferent solvents may be used hydrocarbons, such as benzene, toluene, dioxane, as well as chloroform, pyridine, dimethylformamide, tetrahydrofuran etc., (4) Employing higher molecular alcohols.

For obtaining good yields it is absolutely necessary to exclude water on carrying out the reaction in order to avoid saponification of the alkoxyimino-isoindolenines formed during reaction to the corresponding mono-imino-imides or arylene dicarboxylic acid imides. As starting materials for this reaction o-arylene dinitriles capable of yielding phthalocyanines may be used as are described above sub (A).

Suitable alcoholates are, for instance, those obtained from sodium, potassium and lithium. As alcohol components monovalent alcohols may be used, for instance, methyl alcohol, ethyl alcohol, amyl alcohol, as well as polyvalent alcohols, such as ethylene glycol, propylene glycol, 1.3- and 1.4-butylene glycol, glycerol, and also still higher valent alcohols. Of course, it is also possible to employ the ethers of these polyvalent alchols provided that they contain at least one free hydroxy group. It is not absolutely necessary to charge ready-made alcoholates into the reaction mixture but also the alkali metal may be introduced into the alcoholic solution of the o-dinitrile. Also alcoholic solutions of alkali hydroxides may find application. Instead of using said alcoholates the reaction may also be carried out with agents acting as alcoholates. A solution of sodium amide in alcohol may be mentioned as example.

On carrying through the above-described reaction the polyvalent alcohols may be replaced by compounds carrying, besides at least one hydroxy group, still other functional groups, for instance, amino groups. On using such compounds, however, reaction does not proceed so clearly as in the case of polyalcohols. In this manner, crystallized compounds are partly obtained which in a way behave differently then the alkoxy compounds produced by means of other alcohols.

The best method to be applied for isolation mainly depends upon the composition of the reaction solution and the nature of the alcohol component used. If the process has been performed without the addition of an indifferent solvent it is often sufficient to add a solvent wherein the condensed alkoxy compounds are insoluble, the alcoholic solution of the reaction product being preferably concentrated in vacuo. Agents reducing the solubility of the alkoxy compounds are, for instance, hydrocarbons, e. g. ligroin. If, however, alcohols or solvents mixible with water are only present in the reaction solution precipitation of the alkoxy compounds may be accomplished by addition of water or aqueous salt solutions, such as sodium chloride or sodium acetate solutions. On isolating the precipitate in known manner the alkali metal salts of alkoxy compounds are obtained.

If, however, the alkali metal-free alkoxy compounds are to be obtained isolation is preferably accomplished by treating the reaction solution with acids, for instance, carbon dioxide, formic acid, acetic acid or hydrochloric acid, and separating the precipitated alkali metal salts of these acids in known manner. From the colorless to at most weakly colored solutions thus obtained the alkali metal-free alkoxy-compounds may be obtained in the same manner as described above.

If the reaction solution contains indifferent solvents isolation may be achieved by separating out the dissolving component, i. e. generally the lower monovalent alcohols, by blowing through inert gases. If, in this manner, the larger portion of the alcohol is removed the sodium compounds precipitate in form of deep yellow compounds. Further portions of these compounds may be obtained from the mother solution by diluting with ligroin or other hydrocarbons. It is mostly of advantage to achieve isolation at very low temperatures, especially in case polyvalent alcohols were used as alcohol components, as in this case the chief amount of the product is mostly already obtained.

The condensed alkoxy-imino-isoindolenines obtained as described above represent light yellow to colorless, sometimes crystallized, sometimes amorphous compounds which dissolve in many solvents, for instance, pyridine or alcohols. Their solubility greatly depends on the degree of condensation and especially upon whether alcohols are contained as an addition in the alkoxy compounds. The higher molecular compounds are generally more difficultly soluble than the lower condensation products whereas the alcohol addition products mostly more readily dissolve than the alcohol-free products at the same degree of condensation. On recrystallizing the products containing alcohol as an addition alcohol is mostly split off and the more difficultly soluble compounds which are poorer in alkoxy groups are precipitated. The condensation products may be obtained in form of a chain being formed from two to about six radicals of 3-imino-isoindolenine or also in form of a ring; in the latter case no terminal alkoxy groups but the alkoxy groups only originating from the alcohol added may still be present.

On dry-heating the condensed alkoxy compounds show no sharp melting or decomposition points, however, they gradually sinter at temperatures above 100° C. while forming green to blue products. They are easily converted into deep yellow colored alkali metal salts by means of alkali hydroxides. On adding sodium hydrosulfite and alkali-lye the solutions of the alkoxy imino-isoindolenine compounds or of their alkali metal salts in a mixture of pyridine and water yield blue to blue violet leuco compounds.

(C) *The production of polyisoindolenines.*— The production of the condensed 3-imino-isoindolenines may be accomplished from the most various starting materials, for instance, by causing copper salts in organic solvents to react upon o-arylene dinitriles under more gentle conditions than those customarily applied in the production of phthalocyanines, and isolating the products thus formed.

Suitable starting materials according to this invention are the derivatives of o-arylene dicarboxylic acids being free from carbonyl groups and their nuclear substitution products capable of forming phthalocyanines, which are enumerated in the foregoing sub (A).

As copper salts may be used the salt of the monovalent copper, such as the halides and thiocyanates, and the salts of the bivalent copper, such as the nitrate, acetate, formate. Suitable solvents for carrying out the reaction are aromatic hydrocarbons and their nuclear substitution products, for instance, naphthalene, nitrobenzene, o-dichlorobenzene, as well as tertiary bases, for instance, pyridine. These solvents may be employed alone or in admixture with each other.

The reaction is preferably conducted under conditions under which no substantial amounts of phthalocyanine are formed. This purpose is accomplished on the one hand by an appropriate choice of the copper salt and the solvent and, on the other hand, by processing at temperatures being below those usually applied in the manufacture of phthalocyanine. Copper nitrate, for instance, shows a slight tendency only to form phthalocyanine under the reaction conditions of the new process. Therefore, when processing is done with copper nitrate somewhat higher temperatures may be applied during reaction without phthalocyanine being formed thereby whereas on working with other salts it is mostly of advantage to conduct the reaction at somewhat lower temperatures. The optimum temperature for carrying out the reaction according to this invention is about between 60° and 80° C. when working in aromatic bases, and between 80° and 140° C. when using other solvents.

The composition of the copper-containing polyisoindolenines obtained by the new process varies according to the ratio of the copper salt to the o-arylene dinitrile applied. The molar ratio of copper salt to dinitrile to be used may vary bebetween 1:1 and 1:6. One molecule of copper salt per 2-3 molecules of dinitrile is preferably used.

The procedure to be followed for achieving isolation depends upon whether the products formed during reaction are present in the mixture in a dissolved state or have already precipitated. In the first case, i. e. when the reaction product is still dissolved in the mixture the polyisoindolenines are precipitated by adding substances reducing their solubility in the solvents used, such as water or salt solutions, for instance, aqueous solutions of sodium chloride or sodium acetate or ligroin. When the reaction products have already precipitated isolation is accomplished by conventional methods. The solubility of the reaction products in the reaction mixture varies according to the nature of the copper salt and the solvent used. Thus, for instance, the products produced by means of copper nitrate or copper acetate are difficultly soluble. However, the products obtained by means of the monovalent copper salts are easily soluble in pyridine as well as in nitrobenzene.

By aftertreatment the copper-containing polyisoindolenine obtained according to the invention with acids the difficultly soluble products become easily soluble. This acid treatment is advantageously performed in water-miscible organic solvents by suspending said difficultly soluble polyisoindolenines in acetone, alcohols or pyridine, and cautiously treating them, for instance, with hydrochloric acid. In this manner, for instance, the nitrate-containing product resulsts in the formation of a compound being easily soluble in methanol, however, being still difficultly soluble in acetone. The composition determined by quantitative, elementary analysis shows that the products treated in this manner, depending on the method of production, contain as a rule per 1 atom of copper 4-6 imino-isoindolenine residues and 1-2 negative residues, for instance, hydroxyl groups or acid residues, and furthermore, one or more molecules of an alcohol or water if they have been contacted with these agents.

The metal-containing polyisoindolenines may not only be obtained by synthesis from o-arylene dinitriles but also from other intermediate products of the phthalocyanine synthesis. Thus, for instance, the metal-containing polyisoindolenines are obtainable, for instance, by reacting 1-amino-3-imino-isoindolenines and ammonia with soluble heavy metal compounds and isolating the slightly soluble, higher molecular metal-amino-imino-isoindolenines formed.

Suitable starting materials for carrying out the process according to this invention are the monomeric and condensed 1-amino-3-imino-isoindolenines obtained as described in the copending application Ser. No. 180,696 of even date relating to "New Intermediate Products." The reaction is preferably accomplished in the presence of organic solvents, for instance, alcohols or pyridine. Thus, complex compounds are obtained with a varying content of metal depending on the reaction conditions applied and on the nature of the metal. If the solvents used contain water or alcohol the latter may be added to the complex compounds. For instance, if the reaction is carried out with 1 mol of 1-amino-3-imino-isoindolenine with 1 mol of copper chloride at room temperature a readily crystallizable compound containing 1 mol of copper chloride per 1 mol of the monomeric 1-amino-3-imino-isoindolenine is obtained. In analogous manner, compounds containing 2, 3, 4, 5 or 6 mols of 1-amino-3-imino-isoindolenine per 1 mol of the heavy metal salt may be prepared. Suitable salts of heavy metal are, for instance, salts of cobalt, nickel, copper, chrome, iron and lead.

However, if the reaction is performed at raised temperatures, for instance, at 70-120° C. the individual 1-amino-3-imino-isoindolenine molecules react with each other in the metal compound and ammonia escapes, higher molecular condensation products being formed which are similar to those obtained by reacting condensed 1-amino-3-imino-isoindolenines and the metal salts in the cold. Condensation may proceed so far as to possibly form closed rings with 1 atom of metal consisting of from 4 to 6 molecules of 1-amino-3-imino-isoindolenines with splitting off 4 to 6 molecules of ammonia or of the amine respectively if N-substituted 1-amino-3-imino-isoindolenines have been used.

If the reaction of 1-amino-3-imino-isoindolenines and the complex-forming metals is carried through at still higher temperatures, for instance at 150° C., more or less large amounts of the corresponding metal phthalocyanine are obtained in addition to the above-mentioned complex compounds provided that no relatively large amounts of metal salts, e. g. 1 mol or more referred to 1 mol of 1-amino-3-imino-isoindolenine, are used. In the latter case, slightly soluble to insoluble metal compounds are obtained.

In consideration of the numerous combination possibilities of the various starting materials with the heavy metal salts as well as the possible variations of the molar proportions and of the temperatures a very great number of various, well-defined metal compounds of 1-amino-3-imino-isoindolenines may be thus obtained. The new complex metal compounds are mostly obtained in form of fine, colored crystals, for instance, green, violet, yellow, grey or red, or may also be colorless. They are soluble in concentrated sulfuric acid. With concentrated nitric acid the 1-amino-3-imino-isoindolenines are recovered after diluting in form of their nitrates from the metal compounds provided that no intermolecular condensation due to high reaction temperatures has occurred. The anions-containing, complex metal compounds are mostly insoluble in organic solvents; however, the compounds produced at lower temperatures often readily dissolve in polyvalent alcohols and acid amides, for instance, dimethyl formamide.

Instead of using the aforesaid 1-amino-3-imino-isoindolenines heavy metal-containing polyimino-isoindolenines may also be obtained by reacting, for instance, the condensed 1-alkoxy-3-imino-isoindolenines with soluble heavy metal compounds, preferably in organic solvents, and precipitating the heavy metal compounds thus formed with the addition of substances reducing their solubility. This reaction may be accomplished with the condensed 1-alkoxy-3-imino-isoindolenines described sub (B) and furthermore, with the products obtained according to Linstead and Lowe (Journal of the Chemical Society, London, 1934, page 1026). Alcohols, dioxane, dimethyl formamide and pyridine may be mentioned as solvents wherein the reaction is preferably carried out.

Suitable heavy metal salts are those of heavy metals being capable of forming phthalocyanines. As examples may be mentioned salts of copper, nickel, cobalt, lead, tin, iron and chrome. The salts of the monovalent metals, e. g. of the monovalent copper, show the tendency of forming smaller or larger amounts of phthalocyanine if the reaction is performed at higher temperatures. The anions of the heavy metal salts do not affect the reaction to any material extent. It is an essential feature of the invention that the heavy metal salts dissolve in the solvents or in the mixtures thereof at least to a certain degree so that the reaction of ions may proceed. Depending on the solubility of the heavy metal salt used the reaction is completed within a shorter or longer period of time. Thus, for instance, the reaction is sometimes accomplished already within a few seconds whereas in other cases stirring for 24 hours or still longer is required. Instead of isolating first the alkoxy-imino-isoindolenines it is also possible to use the reaction mixtures containing these compounds for further processing. In order to accelerate the rate of dissolving of the isolated alkoxy compounds an alcoholic solution of a metal alcoholate may be added.

The heavy metal compounds produced as set forth above are precipitated from their solutions with the addition of substances reducing their solubility. Such substances are on the one hand aliphatic hydrocarbons or ethers and on the other hand, i. e. when the reaction has been achieved in a solvent miscible with water, for instance, alcohols, dioxane, dimethyl formamide or pyridine, also water or salt solutions.

The heavy metal compounds thus obtained generally represent amorphous, nearly colorless to brown red substances which dissolve in many organic solvents, such as dimethyl formamide, pyridine, piperidine and dioxane. They are more difficulty soluble in alcohols, formamide etc. They may be easily hydrolysed to the corresponding dicarboxylic acid imide by means of acids. However, the heavy metal compounds obtained from alkoxy compounds in the presence of basic products, such as ammonia or piperidine, show an increased stability towards acids. On dissolving them, for instance in concentrated sulfuric acid, they are converted into phthalocyanines at room temperature already. They dissolve in cold formic acid with red coloration which on heating changes to violet and finally to blue, phthalocyanines being precipitated thereby.

The new stable heavy metal-containing, condensed polyimino-isoindolenines cannot only be obtained from simple starting materials, such as o-arylene dicarboxylic acids, amino-imino-isoindolenines and alkoxy-imino-isoindolenines, but also by reacting concentrated nitric acid upon metal phthalocyanines suspended in organic solvents and treating the primarily formed compounds with basic substances. Suitable reactants for carrying out this reaction are metal-free and metal-containing phthalocyanines, for instance, copper, cobalt, nickel and iron phthalocyanines which may be substituted. These phthalocyanines may be produced according to any method desired. Aliphatic as well as aromatic hydrocarbons or substitution products thereof, for instance, toluene and nitrobenzene, and alcohols and organic acids, e. g. acetic acid, may be used as organic suspension agents. Also mixtures of said agents or mixtures with tertiary bases, for instance pyridine, may find application. The nitric acid employed for this reaction shall be highly concentrated. The reaction proceeds especially smoothly with concentrated nitric acid having a specific gravity of 1.5. The quantity of nitric acid to be used varies between wide limits, viz. quantities being far less than those of the phthalocyanines as well as quantities amounting to a multiple of that of the dyestuff may be employed. The action of nitric acid seems to proceed in various steps. It has been determined, for instance, that by reacting small quantities of nitric acid upon phthalocyanines wherein the metal is capable of varying the valency in the molecule, e. g. in the case of cobalt phthalocyanine, a phthalocyanine containing the metal in a higher valency is produced. Further reaction of the nitric acid, especially when using nitrobenzene as suspension agent, results in the formation of compounds similar to those mentioned in FIAT Final Report 1313, vol. III, page 343, said compounds being obtained in pure form according to this invention. These compounds produced in the Ludwigshafen works of the former I. G. Farbenindustrie by reaction of dilute nitric acid upon phthalocyanines in dilute sulfuric acid are not stable and are readily reconverted in the presence of water or already under the influence of atmospheric moisture into phthalocyanine also without the addition of other substances and without a rise in temperature being necessary. For this reason, these products cannot be technically utilized.

On reacting larger quantities of nitric acid upon phthalocyanine compounds are obtained which may be converted by treatment with basic substances, such as ammonia or amines, into stable, yellow to yellow brown, generally crystalline polyimino-isoindolenines.

A preferred method of carrying out the reaction consists in suspending the phthalocyanines in the said agents and gradually adding nitric acid which is preferably diluted with one of the said suspension agents. Care has to be taken that the reaction temperature does not raise too high. Further working is dependent on the suspension agents and upon the amount of nitric acid used. If processing is performed in solvents, such as glacial acetic acid or toluene, with not too large amounts of nitric acid colored crystalline compounds are obtained which after isolation are treated with bases, for instance, ammonia or amines, preferably in aromatic hydrocarbons. The initially formed crystalline compounds dissolve by the treatment with bases. These compounds are isolated from the solution by precipitating them by adding aliphatic hydrocarbons or ethers and separating them. Isolation of said base-treated dissolved compounds may also be achieved by distilling off the aromatic hydrocarbon, preferably in vacuo.

However, if the reaction is carried through by means of larger amounts of nitric acid in the presence of alcohols the reaction products obtained already dissolve during reaction. The products may be isolated by stirring the solution into ice-common salt-mixtures. By subsequent treatment with aqueous solution of ammonia or other bases the stable, metal-containing polyimino-isoindolenines are obtained.

The stabilized yellow to yellow brown new poly-imino-isoindolenines are soluble in organic solvents except in aliphatic hydrocarbons and ethers. They are mostly difficulty soluble in alcohols.

By treating these polyimino-isoindolenines with alkali lye they are mostly converted into a state which is more readily soluble in alcohols. On working with compounds obtained from cobalt phthalocyanines the treatment with alkali lye yields water soluble products.

The following values were determined by analysis of a product obtained from cobalt phthalocyanine with nitric acid in nitrobenzene and worked up with methanol:

$C = 49.6\%$
$H = 3.7\%$
$N = 17.0\%$
$O = 16.6\%$
$Co = 7.1\%$

A further modification of the process according to the present invention consists in reacting bromine upon phthalocyanine in the presence of an alcohol and treating the primarily formed bromine-addition-products with bases. Suitable starting materials for this reaction are metal-free and metal-containing phthalocyanines, for instance, copper, cobalt, nickel, and iron phthalocyanine which may be substituted and produced by any conventional method. Lower alcohols, for instance, methanol, preferably in admixture with organic bases, e. g. pyridine, are advantageously used as solvents.

Bromine is preferably used in excess in elementary form. The triple weight of bromine referred to the phthalocyanine is advantageously employed. The interaction of bromine may be conducted at room temperature or also at moderately raised temperatures, the dyestuff dissolving almost completely thereby. The bromine-addition-products thus obtained are crystalline, yellow brown compounds which are relatively unstable.

For stabilizing these compounds the reaction mixture may be treated without isolating the bromine - addition - products, with smaller amounts of tertiary bases, preferably pyridine, at higher temperatures which may be increased up to the boiling temperature of the solvent mixture. Difficultly soluble, brown yellow, crystalline compounds containing about 30% of bromine are thus obtained.

Bromine is contained in the stable as well as in the stabilized compounds in a loosely linked state and may be separated with alkaline agents, for instance, ammonia. This behavior shows that the bromine does not substitute the compound under the reaction conditions but it is merely linked thereto.

Splitting off of bromine from the said compounds which are high in bromine is attained in a very simple manner by treatment with ammonia. This step may be achieved by suspending the difficulty soluble products in liquid organic media, for instance, in hydrocarbons, such as benzene, toluene or in nitrobenzene or in tertiary bases, and by introducing ammonia gas or by adding ammonia in any other form, for instance, liquid ammonia.

By treating the suspended bromine compounds with ammonia the compounds go into solution. After removing the bromides the compounds may be recovered from the solution in form of almost halogen-free, yellow, crystalline compounds by adding substances reducing their solubility, for instance, hydrocarbons or ethers.

On treating the bromine-free reaction products with piperidine in pyridine yellow, crystalline products being difficultly soluble in alcohol and yielding the dyestuff in concentrated sulfuric acid already without the addition of reducing agents are obtained.

The products obtained by the base treatment are stable and more readily soluble in most solvents than the products which are high in bromine. For this reason, the base-treated products are preferred in practice, especially for dyeing and printing on the fiber.

A greenish yellow to orange colored, crystalline product obtained from copper phthalocyanine which is free from bromine by treatment with ammonia exhibits the following analysis:

| found | calculated for $C_{33}H_{20}N_8O_2Cu$ |
|---|---|
| $C = 63.2\%$ | $C = 63.0\%$ |
| $H = 3.7\%$ | $H = 3.2\%$ |
| $O = 5.0\%$ | $O = 5.1\%$ |
| $N = 17.8\%$ | $N = 17.8\%$ |
| $Cu = 9.5\%$ | $Cu = 10.1\%$ |

The summation formulae of the new compounds determined by elementary analysis show that these compounds are distinguished from the phthalocyanines used as starting materials by an excess content of two oxygen atoms and that they presumably contain alkoxy groups or alcohols.

Another modification of the process for the manufacture of heavy metal-containing polyimino-isoindolenines consists in reacting nitrates of amino - imino - isoindolenines upon metal phthalocyanines in the presence of indifferent solvents at higher temperatures.

The known metal phthalocyanines which may be substituted and produced by any process desired may be used as starting material. Cobalt phthalocyanine is especially suitable for this reaction. The nitrates of amino-imino-isoindolenines to be used for carrying out the reaction according to the invention may be produced, for instance, by the process of the copending application Ser. No. 180,696 of even date relating to "New Intermediate Products" which comprises, for instance, heating o-arylene dicarboxylic acids, their nuclear substitution products or functional derivatives thereof in the presence of substances yielding ammonia, for instance, urea, as well as in the presence of preferably at least equimolar quantities of nitrate ions and in the presence of catalysts promoting the formation of phthalocyanine from o-arylene dicarboxylic acids, if necessary, in the presence of indifferent solvents, up to temperatures of about 200° C.

The reaction is advantageously conducted at temperatures between 160° and 250° C. For obtaining heavy metal-containing polyimino-isoindolenines with 5 or 6 imino-isoindolenine radicals respectively 1 mol or 2 mols of amino-iminoisoindolenine per 1 mol of phthalocyanine are generally used; it is sometimes of advantage to add some ammonium nitrate. As indifferent solvents preferably solvents are chosen the boiling points of which lie above the reaction temperature applied, for instance, nitrobenzene, trichlorobenzene, naphthalene, quinoline, acetamide, benzene sulfonamide, benzophenone. However, the reaction may also be accomplished in the presence of urea.

The metal-containing polyimino-isoindolenines thus formed may be isolated by separating in known manner the portions already precipitated during or after completion of the reaction. These portions consist of metal-containing polyiminoisoindolenines probably containing nitrite or nitrate residues. Another part of the metal-containing polyimino-isoindolenines remains dissolved in the solvent in form of the free base and may be precipitated by adding ligroin after concentrating the solution or also by evaporating the solution to dryness, preferably in vacuo.

The metal-containing polyimino-isoindolenines obtained by the aforesaid reaction are mostly readily crystallizable compounds which as to their chemical and physical properties resemble those obtained as described in the foregoing. They contain 5 or 6 imino-isoindolenine radicals in the molecule depending on the amount of aminoimino-isoindolenine nitrate used. They precipitate mostly in form of brown to yellow crystals dissolving in methanol and alkali metal lye with reddish yellow coloration. After the addition of reducing agents they are reconverted into the corresponding phthalocyanines on heating.

The metal-containing, stable polyimino-isoindolenines obtained according to the above described processes consist of condensed imino-isoindolenines wherein each individual imino-isoindolenine molecule may carry one alkoxy-, amino- or hydroxy group. The number of the imino-isoindolenine radicals from which they are composed is mostly between 4 and 6 whereby radicals with open chains and radicals having closed rings may be present. In spite of the rather different appearance and behavior of the polyimino-isoindolenines in solvents and towards other chemicals the metal-containing products herein described belong to the same group, viz. to the polyimino-isoindolenines. In consideration of the fact that depending on the pretreatment more or less molecules of water or alcohol may be added—probably to the double linkage of the heterocyclic ring of each individual isoindolenine—and that, for instance, the amino group and eventually also the imino group are capable of yielding salts, and that the metal may be bound in the molecule at any place and in the most various ways, and in further consideration of the differences involved by the chemical properties of the linked metal, the differences of the various compounds as to their appearance, their solubility and their other physical properties, e. g. coloration, by which these compounds are distinguished from each other may be explained.

No particulars can definitely be given as to the kind of linkage of the metal. Generally the complex linkage presumably occurs which may be followed from the fact that metals having the coordination number four preferably form compounds containing four imino-isoindolenine radicals, for instance, copper, and metals having the coordination number six, for instance, cobalt, preferably give compounds containing six iminoisoindolenine radicals. However, all compounds produced according to this invention can be converted into the corresponding phthalocyanines mostly already under gentle conditions and preferably in the presence of a reducing agent. The new metal-containing polyimino-isoindolenines represent valuable intermediate products in the organic-chemical synthesis.

The invention is further illustrated by the following examples without being restricted thereto, the parts being by weight.

EXAMPLES OF DYEING AND PRINTING

*Example 1*

26.7 parts of a monomolecular methoxy-iminoisoindolenine containing an additional molecule of methanol (prepared according to Example 44) or 30.6 parts of a monomolecular ethoxy-iminoisoindolenine containing an additional molecule of ethanol (prepared according to Example 45) are heated at 50° C. for about half an hour with 149 parts of isopropyl alcohol or with 151 parts of methanol, 24 parts of sodium methylate solution (6 parts of sodium in 74.3 parts of methanol) and 100 parts of an ammonium formate solution (8.26 parts of ammonium formate in 91.74 parts of water). This mixture is cooled to room temperature and intimately stirred with 6.4 parts of basic copper acetate and 640 parts of tragacanth thickening consisting of 60 parts of diethyl tartrate, 14.4 parts of tragacanth, 36 parts of glycol and 529.6 parts of water.

Cotton is printed with this paste and the printed material is dried at temperatures between 100 and 120° C. for one hour. The printing is finished by boiling with dilute aqueous formic acid (30 parts in 1000 parts of water) and by subsequently soaping at the boil. After drying clear, full greenish blue shades are obtained.

*Example 2*

70 parts of water, 26.7 parts of a monomolecular methoxy-iminoisoindolenine containing an additional molecule of methanol (prepared according to Example 44) and 100 parts of an aqueous piperidine acetate solution (11.7 parts of piperidine and 8.34 parts of glacial acetic acid in 80 parts of water) are heated at 50° C. for 15 minutes, thereafter cooled to room temperature and intimately stirred with 150 parts of a basic copper acetate solution (4.27 parts of basic copper acetate in 95.73 parts of water) and 640 parts of the tragacanth thickening used in Example 1.

By applying this paste to cotton fabric and by finishing according to Example 1 full, clear, greenish blue shades are obtained.

Example 3

A printing paste is prepared as described in Example 1 from—

30.6 parts of a monomolecular methoxy-imino-isoindolenine containing an additional molecule of methanol (prepared according to Example 44),
146 parts of isopropyl alcohol or
148 parts of methanol,
24 parts of a sodium methylate solution (6 parts of sodium in 74.3 parts of methanol),
100 parts of an ammonium formate solution (8.26 parts of ammonium formate in 91.74 parts of water) or 100 parts of an ammonium carbonate solution (6.4 parts of ammonium carbonate in 93.6 parts of water),
6.4 parts of basic copper acetate and
640 parts of the tragacanth thickening used in Example 1.

By applying this printing paste to cotton and following the procedure of Example 1 full, clear, greenish blue shades are obtained.

Example 4

60 parts of water,
100 parts of an ammonium formate solution (8.26 parts of ammonium formate in 91.74 parts of water) and
35 parts of 1-hydroxy-ethyl-amino-3-imino-isoindolenine are heated at 50° C. for about half an hour. After cooling to room temperature the mixture is stirred with
150 parts of a basic copper acetate solution (4.27 parts of basic copper acetate in 95.73 parts of water) and
640 parts of the tragacanth thickening used in Example 1.

On following the procedure of Example 1 full, greenish blue shades are obtained.

The 1-hydroxy-ethyl-amino-3-imino-isoindolenine is prepared according to Example 24 of the copending application Ser. No. 180,696 of even date relating to "New Intermediate Products."

Example 5

35 parts of 1-hydroxy-ethyl-amino-3-hydroxy-ethyl-imino-isoindolenine (prepared as described in Example 24 of copending application Ser. No. 180,696 of even date relating to "New Intermediate Products"),
143 parts of isopropyl alcohol, or
145 parts of methanol,
24 parts of a sodium methylate solution (6 parts of sodium in 74.3 parts of methanol) and
100 parts of an ammonium formate solution (8.26 parts of ammonium formate in 91.74 parts of water) are heated at 50° C. for about half an hour, cooled to room temperature and mixed with
6.4 parts of basic copper acetate and
640 parts of the tragacanth thickening used in Example 1.

By applying this printing paste according to Example 1 full, greenish blue shades are obtained.

Example 6

100 parts of an ammonium formate solution (8.26 parts of ammonium formate in 91.74 parts of water) or
100 parts of an ammonium carbonate solution (3.2 parts of ammonium carbonate in 95.8 parts of water) are added to a mixture of
160 parts of isopropyl alcohol,
22.2 parts of dimolecular methoxy-imino-isoindolenine (obtained according to Example 54) and
24 parts of a sodium methylate solution (6 parts of sodium in 74.3 parts of methanol). This mixture is heated at 50° C. for about 15–30 minutes and subsequently reacted at room temperature with
4.27 parts of basic copper acetate and stirred with
640 parts of the tragacanth thickening used in Example 1.

The clear, full prints produced on cotton according to Example 1 by means of this paste show a greenish blue shade.

On preparing the printing paste with 5.5 parts of crystallized nickel chloride instead of copper acetate somewhat more covered, greener shades are produced.

Example 7

(a)

25.5 parts of a sodium methylate solution (6 parts of sodium in 74.3 parts of methyl alcohol) are added drop by drop to a mixture of
202 parts of dimethyl formamide and
28.8 parts of phthalonitrile.

This mixture is stirred at 30° C. for about 15 minutes until the intensity of the yellow coloration is no longer increased. Thereafter 9.55 parts of piperidine are slowly introduced at 10–20° C. and the mixture is allowed to stand for some hours. Aliquot portions of the solution (266 parts) may be used for preparing the printing paste.

(b)

0.7 part of finely sifted basic copper acetate is stirred into
27.7 parts of the solution prepared according to (a) and
12.9 parts of isopropyl alcohol are added thereto. The dark brown solution thus obtained is added while vigorously stirring to a mixture of
40 parts of a 6% tragacanth thickening (6 parts of tragacanth in 94 parts of water) and
16 parts of glycol. By applying this printing paste according to Example 1 clear, full copper phthalocyanine prints are produced.

It is an advantage to add 10 parts of diethyl tartrate to the printing paste. Besides diethyl tartrate also ethanol amine, triisopropanol amine, dihydroxyethyl-n-butylamine, glycol formate, chloralhydrate, ammonium phosphate etc. are useful additives.

Example 8

The same procedure as described in Example 7 (b) is followed, however, the basic copper acetate is replaced by 0.945 part of nickel acetate. On applying the printing paste thus obtained to cotton somewhat more covered and greener shades are produced in comparison with those obtained with basic copper acetate.

Example 9

100 parts of a copper bromide solution (6.85 parts of cryst. copper bromide in 93.15 parts of water) and
5 parts of triethanol amine are added to a solution of 20.2 parts of 1-amino-3-imino-isoindolenine (obtained according to copending application Ser. No. 180,696 of even date relating to "New Intermediate Products") in
235 parts of water. The mixture is slowly stirred into 640 parts of the tragacanth mixture used in Example 1.

The goods printed with this paste are dried at 80–90° C. Developing is achieved by neutral or acid steaming for 10 minutes. Clear, blue shades are thus obtained.

*Example 10*

A printing paste is prepared from—

70 parts of water,
150 parts of a basic copper acetate solution (4.27 parts in 95.73 parts of water),
31 parts of the acetate of 1-amino-3-imino-isoindolenine,
100 parts of an ammonium formate solution 8.26 parts in 91.74 parts of water) and
640 parts of the tragacanth thickening used in Example 1.

By applying this printing paste according to Example 1 full, clear copper phthalocyanine prints are obtained.

The acetate of 1-amino-3-imino-isoindolenine may be prepared in the following manner:

Amino-imino-isoindolenine (cf. Example 9) is dissolved in a very small quantity of methanol and the equivalent amount of acetic acid is added to the solution. The greater part of the acetate of amino-imino-isoindolenine precipitates immediately, the part remaining dissolved is obtained by concentrating the solution.

*Example 11*

5 parts of 1-amino-3-imino-isoindolenine (cf. Example 9) are dissolved with slightly heating in
17 parts of glycol and
0.57 part of copper acetate (cryst.) are dissolved with heating in
3 parts of glycol and after cooling stirred into the amino-imino-isoindolenine solution. To this solution are added
19.4 parts of formamide and
5 parts of triethanol amine.

The mixture thus obtained is stirred into 50 parts of a tragacanth thickening (65:1000) and printed on cotton, viscose rayon, staple fibre, or acetate silk. After predrying as usual at 60° C. the copper phthalocyanine is developed and fixed on the fiber by heating for about 15 minutes at 100–120° C.

Development and fixation can also be accomplished by steaming in the Mather and Platt ager for 5–10 minutes. By the usual after-treatment beautiful, clear, blue prints with excellent fastness properties are obtained.

Instead of the copper acetate also—

0.40 part of copper chloride (cryst.),
0.59 part of copper sulfate (cryst.),
0.56 part of copper nitrate (cryst.) or the corresponding amount of any other copper salt, such as glycocoll copper or acetyl acetone copper, or
0.68 part of nickel chloride (cryst.), or
0.63 part of cobalt chloride may be used.

*Example 12*

5 parts of 1-amino-3-imino-isoindolenine (cf. Example 9),
0.68 part of nickel chloride (cryst.),
19.32 parts of glycol,
20 parts of formamide,
5 parts of triethanol amine are stirred into
50 parts of a tragacanth thickening (65:1000).

The printing paste obtained is printed on cotton, viscose rayon, staple fiber or acetate silk. On following the procedure of Example 11 nickel phthalocyanine is produced and fixed on the fiber.

By the usual after-treatment beautiful, clear, blue prints with good fastness properties are obtained.

*Example 13*

5 parts of 1-amino-3-imino-5- or -6-phenyl-isoindolenine (obtained according to Example 30 of copending application Ser. No. 180,696 of even date relating to "New Intermediate Products"),
0.3 part of copper acetate (cryst.),
23.5 parts of glycol,
16.2 parts of formamide,
5 parts of triethanol amine, are stirred into
50 parts of a tragacanth thickening (65:1000) and the paste obtained is printed on cotton, viscose rayon, staple fiber, or acetate silk and the tetraphenyl copper phthalocyanine is fixed on the fiber as described in Example 11.

By the usual after-treatment beautiful, clear, green prints of excellent fastness properties are obtained.

*Example 14*

0.9 part of a copper amino-imino-isoindolenine compound containing 1 atom of copper per 1 molecule of amino-imino-isoindolenine (prepared according to Example 66),
4.58 parts of amino-imino-isoindolenine,
20 parts of glycol,
19.52 parts of formamide,
5 parts of triethanol amine, are stirred into
50 parts of a tragacanth thickening (65:1000) and the paste obtained is printed on cotton, viscose rayon, staple fiber, or acetate silk and the copper phthalocyanine is produced and fixed on the fiber as described in Example 11.

By the usual after-treatment beautiful, clear, blue prints of excellent fastness properties are obtained.

*Example 15*

1.31 parts of the copper-amino-imino-isoindolenine compound containing 1 atom of copper per 2 molecules of amino-imino-isoindolenine (obtained according to Example 73),
4.17 parts of amino-imino-isoindolenine (cf. Example 9),
20 parts of glycol,
19.52 parts of formamide,
5 parts of triethanol amine are stirred into
50 parts of a tragacanth thickening (65:1000) and printed on cotton, viscose rayon, staple fiber or acetate silk and the copper phthalocyanine is produced and fixed on the fiber as described in Example 11.

By the usual after-treatment beautiful, clear, blue prints with excellent fastness properties are obtained.

*Example 16*

2.14 parts of the copper-amino-imino-isoindolenine compound containing 1 atom of copper per 4 molecules of amino-imino-isoindolenine (obtained according to Example 71),
3.4 parts of amino-imino-isoindolenine (cf. Example 9),
20 parts of glycol,
18.68 parts of formamide, 5 parts of triethanol amine are stirred into
50 parts of a tragacanth thickening (65:1000) and printed on cotton, viscose rayon, staple fiber or acetate silk. The copper phthalocyanine is produced and fixed on the fiber as described in Example 11.

By the usual after-treatment beautiful, clear, blue prints with excellent fastness properties are obtained.

*Example 17*

2 parts of a copper-amino-imino-isoindolenine compound containing about 1 atom of copper per 6 molecules of amino-imino-isoindolenine (prepared according to Example 73) and
30 parts of glycol are ground in a ball mill for one hour and stirred into
50 parts of a tragacanth thickening (65:1000).

To this mixture are added 5 parts of diethyl tartrate or
5 parts of an ammonium thiocyanate solution (5 parts in 100 parts of water) and
13 parts of water.

This printing paste containing 2% of copper-amino-imino-isoindolenine is applied to cotton. The printed material is pre-dried as usual and the copper phthalocyanine is produced in the Mather and Platt ager by steaming for about 5 minutes.

After rinsing and soaping as usual the printed material shows clear, blue shades with good fastness properties. Beautiful, clear shades are also obtained on viscose rayon.

*Example 18*

A printing paste is prepared from—

100 parts of the salt of the reaction product product from about 4 mols of ethylene oxide upon 1 mol of triethanol amine with the leuco sulfuric ester of dibromo-anthanthrone.
50 parts of urea,
50 parts of thiodiglycol,
20 parts of phenol 1:1 (10 parts of phenol and 10 parts of water,
220 parts of water,
500 parts of a starch-tragacanth thickening,
25 parts of ammonium thiocyanate 1:1 (12.5 parts of ammonium thiocyanate and 12.5 parts of water),
25 parts of a sodium chlorate solution (8.3 parts of sodium chlorate and 16.7 parts of water),
10 parts of ammonium vanadate 1:100 (1 part of ammonium vanadate and 99 parts of water)

1000 parts and is used for printing in combination with one of the phthalocyanine printing pastes described in the Examples 26 to 29.

By drying, moist steaming and after-treating with nitrite-sulfuric acid (1 gram of sodium nitrite and 5 cc. of sulfuric acid per liter) for 1 to 2 minutes and subsequently soaping clear copper phthalocyanine prints are obtained besides the orange colored designs.

*Example 19*

0.47 part of an orange red copper compound (prepared according to Example 61a of copending application Ser. No. 180,696 of even date relating to "New Intermediate Products"),
4.73 parts of amino-imino-isoindolenine, cf. Example 9,
20 parts of glycol,
19.8 parts of formamide,
5 parts of triethanol amine, are stirred into
50 parts of a tragacanth thickening (65:1000) and the paste obtained is printed on cotton, viscose rayon, staple fiber, or acetate silk and the copper phthalocyanine is fixed on the fiber as described in Example 11.

If development has been accomplished with neutral steam the printed goods are preferably after-treated with formic acid. By the usual after-treatment clear shades of excellent fastness properties are obtained.

Instead of said copper compound about 0.50 part of the reaction products from phthalonitrile, copper halides, formamide, and urea, which are described in FIAT Final Report 1313, vol. III, pages 344 and 342, may be used, the same results being obtained thereby.

*Example 20*

4 parts of amino-imino-isoindolenine (cf. Example 9) are dissolved in
50 parts of glycol and
0.6 part of crystallized copper chloride and
50 parts of dimethyl formamide are added thereto. The solution thus obtained is stirred into
500 parts of water.
100 parts of cotton are dyed in this solution while moving for about 15 minutes at 40–50° C. The material is squeezed off, pre-dried in the air and the copper phthalocyanine is produced by heating at about 120° C. Development may also be performed immediately after dyeing while the dyed goods are still moist. Beautiful, clear shades of excellent fastness properties are obtained.

Instead of cotton also viscose rayon, acetate silk, staple fiber and also paper can be dyed in the above dye-bath.

*Example 21*

50 parts of amino-imino-isoindolenine (cf. Example 9) are dissolved with slightly heating in
150 parts of glycol and introduced at room temperature into a solution of
5.7 parts of copper acetate in
50 parts of glycol. To this mixture are added
50 parts of triethanol amine,
144.3 parts of formamide,
50 parts of diethyl tartrate. This mixture is subsequently introduced into a solution of
16 parts of sodium hydroxide in
484 parts of water.

Fabrics of cotton, viscose rayon, and staple fiber are padded in this solution and the phthalocyanine is developed after pre-drying as usual by heating at 100–120° C. or by neutral or acid steaming in the Mather and Platt ager. After rinsing and soaping as usual clear shades with excellent fastness properties are obtained.

In order to produce a white resist on the padded goods the same are printed after pre-drying with a paste consisting of 150 parts of a 50% aqueous titanium dioxide paste,
150 parts of oxalic acid,
150 parts of water and
550 parts of a tragacanth thickening (65:1000).

After printing the goods are pre-dried and the dyestuff is produced.

Example 22

50 parts of 1-amino-3-imino-isoindolenine (cf. Example 9) are pasted up with
200 parts of glycol.
50 parts of a copper chloride solution (118.6 parts of crystallized copper chloride in 1000 parts of aqueous solution) and
150 parts of formamide and
50 parts of triisopropanolamine are subsequently added with stirring. The solution obtained is then stirred into a mixture of
300 parts of a tragacanth thickening (65:1000),
30 parts of ammonium bicarbonate and
100 parts of a saturated ammonium carbonate solution and
70 parts of water are added to form 1000 parts.

Following the printing recipes of Example 11 this paste yields clear, blue prints with excellent fastness properties.

Example 23

50 parts of 1-amino-3-imino-isoindolenine (cf. Example 9) are pasted up with
200 parts of glycol and
50 parts of a copper chloride solution (118.6 parts of crystallized copper chloride in 1000 parts of aqueous solution),
150 parts of formamide and
50 parts of triisopropanolamine are stirred in. The mixture obtained is added to
500 parts of a tragacanth thickening (65:1000) to form 1000 parts.

Following the printing recipes of Example 11 this paste yields clear, blue prints with excellent fastness properties.

Example 24

50 parts of 1-amino-3-imino-isoindolenine (cf. Example 9) are heated with
100 parts of ethanol,
50 parts of thiodiglycol,
40 parts of formamide and
50 parts of triethanol amine at 35° C. for about 5 minutes and mixed after cooling to 15–20° C. with
50 parts of a copper chloride solution (118.6 parts of crystallized copper chloride in 1000 parts of aqueous solution). The solution is stirred into a mixture of
350 parts of a tragacanth thickening (65:1000),
30 parts of ammonium bicarbonate and
100 parts of a saturated ammonium carbonate solution and made up with
180 parts of water to form 1000 parts.

Following the printing recipes of Example 11 this paste yields clear, blue prints with excellent fastness properties.

Example 25

50 parts of 1-amino-3-imino-isoindolenine (cf. Example 9) are heated at 35° C. for about 35 minutes with
50 parts of thiodiglycol,
100 parts of formamide and
50 parts of triethanol amine or triisopropanol amine and after cooling to 15–20° C., mixed with
50 parts of a copper chloride solution (118.6 parts of crystallized copper chloride in 1000 parts of aqueous solution). The mixture is stirred into
350 parts of a tragacanth thickening (65:1000) containing
30 parts of ammonium bicarbonate and
100 parts of a saturated ammonium carbonate solution and made up with
220 parts of water to form 1000 parts.

Following the printing recipes of Example 11 this paste yields clear, blue prints with excellent fastness properties.

Example 26

70 parts of 1-amino-3-imino-isoindolenine (cf. Example 9) are intimately mixed with
300 parts of the undermentioned solvent mixture and
70 parts of a copper chloride solution (118.6 parts of crystallized copper chloride in 1000 parts of aqueous solution) and stirred into
375 parts of a tragacanth thickening (65:1000) containing
25 parts of ammonium acetate. Thereto are added
30 parts of a 45.75% sodium hydroxide solution and the mixture is made up with
130 parts of water to form 1000 parts.

Following the printing recipes of Example 11 this paste yields on viscose pale crepe clear, blue prints with excellent fastness properties.

The composition of the above-mentioned solvent mixture is as follows:

4 parts of formamide,
5 parts of thiodiglycol,
2.5 parts of diglycol,
7 parts of triisopropanol amine,
5 parts of formyl-methyl-aniline,
5 parts of isobutyl alcohol.

Example 27

70 parts of 1-amino-3-imino-isoindolenine (cf. Example 9),
300 parts of the undermentioned solvent mixture,
70 parts of a copper chloride solution (118.6 parts of crystallized copper chloride in 1000 parts of aqueous solution) are intimately mixed and stirred into
375 parts of a tragacanth thickening (65:1000).

25 parts of ammonium acetate are added thereto and the solution is made up with water to form 1000 parts.

Following the printing recipes of Example 11 this paste yields on viscose lustre crepe clear, blue prints with excellent fastness properties.

The composition of the above-mentioned solvent mixture is as follows:

4 parts of formamide,
5 parts of thiodiglycol,
2.5 parts of diglycol,
7 parts of triisopropanol amine,
5 parts of formyl-methyl-aniline,
5 parts of hexahydrophenyl-ethyl-acetamide.

Example 28

70 parts of 1-amino-3-imino-isoindolenine (cf. Example 9),
200 parts of the solvent mixture used in Example 27, and
70 parts of a copper chloride solution (118.6 parts of crystallized copper chloride in 1000 parts of aqueous solution) are intimately mixed and stirred into
375 parts of a tragacanth thickening (65:1000).
25 parts of ammonium acetate are added thereto and the solution is made up with
260 parts of water to form 1000 parts.

Following the printing recipes of Example 11 this paste yields on staple fiber clear, blue prints with excellent fastness properties.

Example 29

55 parts of 1-amino-3-imino-isoindolenine (cf. Example 9),
275 parts of the solvent mixture used in Example 27,
50 parts of a copper chloride solution (118.6 parts of crystallized copper chloride in 1000 parts of aqueous solution) are intimately mixed and stirred into
560 parts of a tragacanth thickening (65:1000).
25 parts of ammonium acetate and
46 parts of a 30% sodium hydroxide solution are added thereto.

Following the printing recipes of Example 11 this paste yields on cuprammonium silk clear, blue prints with excellent fastness properties.

In the processes of Examples 26 to 29 diglycol may be replaced by glycol or glycerine. Triisopropanol amine may be replaced by triethanol amine and hexahydro-phenyl-acetate-amide by dimethyl formamide or toluene sulfonamide. On using instead of ammonium acetate 30 parts ammonium lactate somewhat weaker, however, very pure, even and well printed dyeings are obtained.

Example 30

50 parts of 1-amino-3-imino-isoindolenine (cf. Example 9) are stirred with
50 parts of thiodiglycol,
40 parts of formamide and
30 parts of ammonium bicarbonate until a thick paste has been formed. The paste is mixed with
50 parts of triethanol amine or triisopropanol amine and a mixture of
50 parts of a copper chloride solution (118.6 parts of crystallized copper chloride in 1000 parts of aqueous solution) and
200 parts of concentrated ammonia. The mixture is made up with water to form 900 parts. The mixture is slightly heated until the reactants have been dissolved, and subsequently mixed with
100 parts of a tragacanth thickening (65:1000).

The solution is used for padding vegetable fibers. After drying and steaming as usual, treating with dilute, organic acids full copper phthalocyanine dyeings are obtained. The padding solution may also be employed for resist printing. A white resist is obtained, for instance, by printing the padded goods before steaming with sodium hydroxide solution containing tragacanth or oxalic acid solution containing tragacanth.

Example 31

10 parts of 1-amino-3-imino-isoindolenine (cf. Example 9),
50 parts of thiodiglycol,
40 parts of formamide,
50 parts of triethanol amine,
10 parts of a copper chloride solution (118.6 parts of crystallized copper chloride in 1000 parts of aqueous solution),
10 parts of concentrated ammonia and
5 parts of ammonium acetate are mixed with each other, made up with water to form 800 parts and stirred with
200 parts of a tragacanth thickening (65:1000).

On padding vegetable fibers with this solution, following thereby the procedure of Example 30, clear, blue dyeings in light shades are obtained.

Example 32

82 parts of 5- or 6-phenl-1-amino-3-imino-isoindolenine (cf. Example 13) are mixed with
100 parts of dimethyl formamide,
100 parts of formamide,
100 parts of thiodiglycol,
50 parts of triethanol amine or triisopropanol amine and
50 parts of a copper chloride solution (118.6 parts of crystallized copper chloride in 1000 parts of aqueous solution) and stirred into a mixture of
393 parts of a tragacanth thickening (65:1000) and
25 parts of ammonium acetate.

On printing this paste on vegetable fibers brilliant green tetraphenyl copper phthalocyanine prints are obtained. If copper chloride is replaced by the equivalent amount of nickel chloride the printing paste yields somewhat more covered, but extraordinarily full tetraphenyl nickel phthalocyanine prints.

Example 33

5.1 parts of 4- or 7-aza-1-amino-3-imino-isoindolenine (obtained as described in Example 14 of copending application Ser. No. 180,696 of even date relating to "New Intermediate Products"), are intimately mixed with
25 parts of a solvent mixture consisting of—
    4 parts of formamide,
    5 parts of thiodiglycol,
    2.5 parts of diglycol,
    7 parts of triisopropanol amine,
    5 parts of hexahydrophenyl - ethyl - acetamide and
    5 parts of formyl-methyl-aniline,
5 parts of a copper chloride solution (118.6 parts of crystallized copper chloride in 1000 parts of aqueous solution) and
3 parts of benzaldehyde disulfite and stirred into
37.5 parts of a tragacanth thickening (65:1000) containing 7 parts of a solution of ammonium lactate in water (3 parts of lactic acid (100%) neutralized with ammonia). The printing paste is made up with water to form 100 parts.

On applying this paste, for instance, to cotton a clear, reddish blue print of very good fastness properties is obtained after the usual drying, steaming and after-treatment with hot dilute formic acid (20 per 1000 parts of water).

Instead of 4- or 7-aza-1-amino-3-imino-isoindolenine its lactate may also advantageously be used for the preparation of the printing paste. The lactate is easily obtained by reacting the base dissolved in methanol by means of sodium hydroxide solution, with lactic acid preferably diluted with dioxane and admixed with somewhat sodium lactate.

*Example 34*

On following the procedure of Examples 22 to 32, however, replacing 1-amino-3-imino-isoindolenine or the corresponding phenyl derivative by:

(1) 5- or 6 - methyl - 1 - amino - 3 - imino - isoindolenine obtainable according to Example 51 of copending application Ser. No. 180,696 of even date relating to "New Intermediate Products,"
(2) 5- or 6-tertiary-butyl-1-amino-3-imino-isoindolenine obtainable according to Example 36 of the aforesaid copending application,
(3) 4.5 - dichloro - 1 - amino - 3 - imino - isoindolenine obtainable according to Example 39 of the aforesaid copending application,
(4) 1 - amino - 3 - imino - isoindoleninyl - 5- or 6-phenylsulfone obtainable according to Example 40 of the aforesaid copending application,
(5) 5- or 6 - methoxy - 1 - amino - 3 - imino - isoindolenine obtainable according to Example 48 of the aforesaid copending application,
(6) 5- or 6 - ethoxy - 1 - amino - 3 - imino - isoindolenine obtainable according to Example 48 of the aforesaid copending application,
(7) 5- or 6 - phenoxy - 1 - amino - 3 - imino - isoindolenine obtainable according to Example 15 of the aforesaid copending application,
(8) 4.5- or 6.7 - benzo - 1 - amino - 3 - imino - isoindolenine obtainable according to Example 46 of the aforesaid copending application,
(9) 5.6 - diphenyl - 1 - amino - 3 - imino - isoindolenine obtainable according to Example 16 of the aforesaid copending application, clear, greenish-blue, blue green to yellowish green prints are produced.

*Example 35*

50 parts of phthalonitrile are heated in a solution of
2 parts of metallic sodium in
157.8 parts of absolute ethyl alcohol to the boil for 20 minutes. After cooling ammonia is passed into the solution for 10 minutes. When the deep yellow coloration has disappeared the solution is diluted with
250 parts of a solvent mixture consisting of—
    4 parts of formamide,
    5 parts of thiodiglycol,
    2.5 parts of diglycol ether,
    5 parts of triisopropanol amine and
    5 parts of formyl-methyl-aniline.
The mixture is then stirred with
50 parts of a copper chloride solution (118.6 parts of crystallized copper chloride in 1000 parts of aqueous solution) and mixed with
400 parts of a tragacanth thickening (65:1000),
25 parts of ammonium acetate and
65.2 parts of water to form 1000 parts.

On applying this paste to vegetable fibers clear copper phthalocyanine prints are obtained after the acid or neutral steaming and the usual after-treatment with dilute formic acid (30:1000) and subsequently soaping.

*Example 36*

For producing multi-colored prints a printing paste is prepared from 80 parts of a mixture of 1-(2'-.3'-hydroxy-naphthoyl - amino) - 2 - methoxybenzene and the sodium salt of the diazoamino compound of diazotized 1-amino-2.5-dichlorobenzene and 1-methyl-amino-benzene-2-carboxylic acid-4-sulfonic acid,
50 parts of glycol-monoethyl ether,
120 parts of diethyl amino ethanol,
500 parts of a starch-tragacanth thickening and
250 parts of water 1000 parts.

On applying this paste to cotton in combination with one of the copper phthalocyanine pastes described in Examples 22 to 29 two-colored designs are obtained after acid or neutral steaming and the usual after-treatment.

*Example 37*

A printing paste consisting of—

30 parts of the dyestuff prepared from 1-amino-5-benzoylamino-anthraquinone and oxalylchloride in nitrobenzene,
345 parts of water,
70 parts of wheat starch,
150 parts of a tragacanth thickening (65:1000),
70 parts of British gum powder,
132 parts of glycerine,
120 parts of potassium carbonate,
80 parts of sodium sulfoxylate formaldehyde,
3 parts of anthraflavic acid is applied to cotton in combination with one of the copper phthalocyanine pastes described in the Examples 26 to 29. After drying, moist steaming, after-treating with an aqueous solution of potassium bichromate and acetic acid (2 parts of potassium bichromate and 5 parts of 30% acetic acid in 1000 parts) and by subsequently soaping the blue copper phthalocyanine prints are obtained in addition to the yellow designs of the above-described dyestuff. Designs of more than two colors may be produced in analogous manner. Thus, for instance, besides 5- or 6-phenyl-1-amino-3-imino-isoindolenine (cf. Example 13) 1-amino-3-imino-isoindolenine (cf. Example 9) may be printed with copper salts, besides nickel salts, and several developing dyestuffs, vat or anthrasol dyestuffs.

*Example 38*

A printing paste each consisting of—

(a)

50 parts of 1-amino-3-imino-isoindolenine (cf. Example 9),
170 parts of glycol,
150 parts of formamide,
50 parts of triisopropanol amine,
50 parts of a copper chloride solution (118.6 parts of crystallized copper chloride in 1000 parts of aqueous solution),
450 parts of a tragcanth thickening and
80 parts of water 1000 parts or (b)

60 parts of a mixture consisting of 3.3'-dimethyl-4.4'-diazeto-azethyl-amino-diphenyl and the sodium salt of the diazo-amino compound of diazotized 1-amino-2-methoxy-5-chlorobenzene and sarcosine,
30 parts of diglycol ether,
50 parts of triisopropanol amine,
410 parts of water and
450 parts of a tragacanth thickening 1000 parts is prepared. 75 to 25 parts of the printing paste (a) are mixed with 25 to 70 parts of the printing paste (b). By printing, drying, acid steaming and the usual after-treatment bluish to yellowish, clear green shades are obtained on cotton or other fabrics.

Example 39

A printing paste is prepared from—

23.2 parts of the copper containing condensed imino-isoindolenine obtained by reacting copper phthalocyanine with bromine in methyl alcohol and after-treatment with ammonia (obtained according to Example 88),
50 parts of dimethyl formamide,
13.3 parts of sodium methylate solution (6:100),
250 parts of a solvent mixture consisting of—
    4 parts of formamide,
    5 parts of thiodiglycol,
    2.5 parts of diglycol ether and
    5 parts of triisopropanol amine,
400 parts of a tragacanth thickening (65:1000) and
263.5 parts of methanol.

After printing, drying, acid or neutral steaming or heating above 100° C. and by the usual after-treatment clear copper phthalocyanine dyeings are obtained on cotton which may be intensified by the addition of 30 parts of 1-amino-3-imino-isoindolenine to the printing paste.

Example 40

A printing paste is prepared from—

50.4 parts of the cobalt containing condensed imino-isoindolenine obtained from cobalt phthalocyanine in nitric acid (described in Example 87),
100 parts of dimethyl formamide,
100 parts of thiodiglycol,
100 parts of diglycol ether,
53.2 parts of a sodium methylate solution (6:100) or the equivalent amount of concentrated sodium hydroxide solution,
400 parts of tragacanth thickening (65:1000) and
196.4 parts of water 1000 parts.

By applying this paste, for instance, to cotton or cuprammonium silk, drying, neutral or acid steaming or heating above 100° C., the usual after-treatment with dilute, hot formic acid (30 grams per liter) and subsequently soaping full cobalt phthalocyanine prints are obtained.

Example 41

20 parts of cobalt containing polyimino-isoindolenine (obtained according to Example 90) are dissolved in
86 parts of a solvent mixture consisting of—
    2.5 parts of glycerine,
    3.5 parts of thiodiglycol,
    4 parts of diglycol ether and
    10 parts of dimethyl formamide, and
6 parts of 30% sodium hydroxide solution, thereupon diluted with
185 parts of a solvent mixture consisting of—
    6.5 parts of formamide,
    5 parts of dimethyl formamide,
    2 parts of toluene sulfonamide and
    5 parts of triethanol amine,
mixed with
25 parts of butyraldehyde bisulfite and stirred into
400 parts of a tragacanth thickening (65:1000) and
278 parts of water 1000 parts.

By printing this paste on cotton and cuprammonium silk, drying, acid or neutral steaming, the usual after-treatment with hot, dilute formic acid (30 grams per liter) and soaping at the boil full cobalt phthalocyanine dyeings are produced. Butyraldehyde bisulfite may be replaced by benzaldehyde bisulfite, acetone bisulfite etc. Formic acid may be replaced by other acids, e. g. hydrochloric acid.

Example 42

On following the procedure of Example 33, however, replacing 4- or 7-aza-1-amino-3-imino-isoindolenine by the equivalent amount of 4.5.6.7-tetrahydro-5- or 6-methyl-1-amino-3-imino-isoindolenine (obtained according to Example 41 of copending application Ser. No. 180,696 of even date relating to "New Intermediate Products") reddish blue prints are produced.

The 1-amino-3-imino-isoindolenine may also be replaced by equivalent amounts of their derivatives substituted in the amino group, especially the Schiff's bases prepared with acetaldehyde or the diazoamido-compounds formed with diazotized anilines.

Particularly beautiful prints are produced by using in Examples 22 to 32 instead of the free bases their salts, for instance, the carbonate or the carbamic acid derivatives, the acetate, formate, methoxy acetate, glycolate, lactate, chloride, bromide, if necessary, in combination with sodium hydroxide solution (for instance, when the tartrate or oxalate are employed).

Example 43

6 parts of the reaction product obtained from the chlorohydrate of the imino ether prepared according to Example 44 of copending application Ser. No. 180,696 of even date relating to "New Intermediate Products" by treatment with alcoholic ammonia after evaporation of the latter, are mixed with stirring with
25 parts of a solvent mixture consisting of—
    4 parts of formamide,
    5 parts of thiodiglycol,
    2.5 parts of diglycol,
    5 parts of triisopropanol amine and
    5 parts of formylmethyl aniline and introduced into a mixture of
5 parts of a copper chloride solution (118.6 parts of crystallized copper chloride in 1000 parts of water),
37.5 parts of a tragacanth thickening (65:1000),
2.5 parts of ammonium acetate and
24 parts of water 100 parts and printed on cotton or artificial fibers. After the usual pre-drying and steaming clear, blue copper phthalocyanine prints are obtained.

EXAMPLES OF PRODUCING THE NEW INTERMEDIATE PRODUCTS

Example 44

50 parts of very finely powdered phthalonitrile are introduced with stirring into a solution of
10 parts of sodium in
237 parts of methanol at room temperature. The temperature gradually rises to 35–40° C. and falls again.

The starting product gradually dissolves with weakly yellow coloration and the addition compound separates in crystals before the product has completely been dissolved. After 3 hours' stirring at room temperature the solution is cooled to −10° C., sucked off, and the precipitated methoxy-iminoisoindolenine is washed with a small amount of cold 50% methanol until the yellowish mother solution is removed from the almost colorless crystals. The product is dried at room temperature in vacuo over calcium chloride.

The yield amounts to 47.5 parts of methoxy-imino-isoindolenine having one molecule of $CH_3OH$ as an addition. The product consists of brilliant, almost colorless small prisms which decompose at 132–134° C. with the generation of gas and the formation of a yellow green melt.

Example 45

12.5 parts of sodium are dissolved in
789 parts of absolutely anhydrous ethyl alcohol. After cooling to +20° C.
128 parts of very finely powdered phthalonitrile are introduced into the solution. The temperature rises to 25° C. within 20 to 30 minutes and is kept at 25° C. by moderately cooling.

The phthalonitrile dissolves gradually and the reaction product precipitates from the weakly yellow solution in small, colorless crystals.

If evolution of heat no longer is perceptible—after about 1 to 2 hours—the solution is cooled to −10° C. for completing crystallization, sucked off and the crystals are washed with ice-cold 50% alcohol until the washings are colorless. Thereupon the crystals are washed with water and dried in vacuo at 30° C. until constancy of weight is attained. 180 parts of 1-ethoxy-3-imino-isoindolenine having a further mol of $C_2H_5OH$ as an addition are obtained in form of a colorless, sandy crystal flour. The yield corresponds to 87% of theory. The product is soluble in cold 5% acetic acid and melts at 138–142° C. while splitting off alcohol and with the formation of a green melt.

Example 46

2.3 parts of sodium are dissolved in excess ethyl alcohol and the solution is reduced in vacuo to 18 to 23 parts. The ethylate paste thus obtained is stirred with 52–64 parts of liquid ammonia in a transparent Dewar container.
12.8 parts of phthalonitrile in very finely distributed form are rapidly added to the solution with stirring at about −30° C. Almost complete dissolution rapidly takes place while $NH_3$ is extracted by vigorously boiling. Then a colorless reaction product crystallizes with further boiling. The reaction mixture is stirred for another 10 minutes, slowly treated with
100 parts of ice water, sucked off and the crystals are thoroughly washed with water. After drying in vacuo at 30–40° C. until constancy of weight is attained 16 parts of a practically colorless substance which is identical with the product described in Example 45 are obtained. The yield amounts to 92% of theory.

Example 47

The procedure of Example 46 is followed, however, ethanol is replaced by methanol. The dinitrile dissolves readily. Methoxy-imino-isoindolenine is precipitated by diluting with saturated common salt solution. After removing ammonia the product proves to be stable in water and may be dried in vacuo. The yield amounts to 13.4 parts of methoxy-imino-isoindolenine corresponding to 76% of theory. By adding ammonium nitrate solution to the filtrate some difficultly soluble nitrate of amino-imino-isoindolenine may be precipitated in crystalline form.

Example 48

On following the procedure of Example 45, however, replacing 2.5 parts of sodium by 4 parts of potassium, approximately the same yield of metal-free ethoxy-imino-isoindolenine is obtained.

Example 49

A solution of—
4.3 parts of sodium amide in
79 parts of methanol is reacted with
12.8 parts of phthalonitrile at 20° C. up to maximum 26° C.

After stirring for 3 hours, cooling to −10° C., sucking off, washing and drying, besides condensed isoindolenine derivatives remaining in the yellow alkaline solution, about 9.5 to 10 parts of monomeric methoxy-imino-isoindolenine corresponding to 60% of theory.

Example 50

On following the procedure of Example 45, however, charging instead of 12.5 parts of sodium the double amount, i. e. 25 parts of sodium, the temperature rises more rapidly. The same iso-indolenine derivative as described in Example 45 is obtained in equally good yield.

Reducing the amount of sodium to 6 parts, the yield of ethoxy-imino-isoindolenine is reduced to about 113 parts whereas a larger quantity of condensed ethoxy-imino-isoindolenines is contained in the more intensely yellow colored solution.

Example 51

2.5 parts of sodium are dissolved in isopropyl alcohol and the solution obtained is concentrated to about 18 parts by distilling off the excess isopropyl alcohol. The isopropylate paste is made up in a Dewar container with liquid ammonia to about 70 parts, thereupon 12.8 parts of very finely powdered phthalonitrile are added in portions with stirring. The reaction is complete within a few minutes.

The reaction mixture is gradually diluted with ice and water so as to form 370 parts, rapidly sucked off and the precipitate is washed with water. The crude product is almost colorless, however, becomes weakly yellowish at room temperature in the vacuo exsiccator after some hours. The yield amounts to 15.8 parts of 1-isopropyloxy-3-imino-isoindolenine.

From ligroin boiling at 90–95° C., the 1-iso-propyloxy-3-imino-isoindolenine crystallizes in large, brilliant, almost colorless to slightly yellowish prisms melting at 95–96° C.

The process may be modified by dissolving first the sodium in aqueous ammonia, adding 1 mol of alcohol or more to this solution drop by drop—the deep blue solution brightening thereby with the formation of alcoholate—and then introducing the nitrile.

In analogous manner react n-propylalcohol, n- and isobutanol, hexylalcohol and cyclohexanol.

Example 52

12.8 parts of phthalonitrile are dissolved in
55.5 parts of hot glycol and the solution is cooled to 60° C. whereby part of the dinitrile precipitates again. Then, a solution heated to 60° C. consisting of
1.2 parts of sodium in
55.5 parts of glycol is added with stirring.

The dinitrile dissolves within about 5 minutes with weakly greenish yellow coloration. On subsequently cooling the reaction product crystallizes in colorless small prisms. It is sucked off at about 0° C., washed with water and dried first in vacuo at low temperature, then, for a short time, at temperatures up to 95° C.

The colorless product which is believed to be 1-β-hydroxyethoxy-3-imino-isoindolenine is obtained in a quantity of 11.2 parts and melts in its crude state at 167° C., after recrystallization from methanol at 170° C. with yellow green coloration. The product is soluble in cold 5% acetic acid and is readily converted into copper phthalocyanine with copper salts at water-bath temperatures.

In the same manner also other glycols, such as propylene glycol, 1.3- and 1.4-butylene glycol as well as higher-valent alcohols and their ethers having at least one free hydroxy group may be reacted with o-dinitriles to form the corresponding imino-isoindolenines.

Example 53

12.8 parts of powdered phthalonitrile are introduced with stirring at room temperature into a solution of
1.2 parts of sodium in
102 parts of monoethanol amine. The temperature rises to about 30° C. and falls again within one hour.

The dinitrile has clearly dissolved during that time. On reacting the clear, almost colorless solution with 105 parts of 10% hydrochloric acid—taking care that the temperature does not exceed 50° C. which is achieved by outside cooling—the condensation product deposits as a colorless, crystalline precipitate. It is cooled to 0° C., sucked off and washed with water. After drying at 95° C. about 19.5 parts of a colorless reaction product free from chlorine melting at 199° C. is obtained. On recrystallization from methanol whereby colorless little needles are obtained the melting point rises only by 1° C. to 199–200° C.

According to elementary analysis the product is a compound having 2 molecules of ethanol amine attached to 1 molecule of phthalonitrile with the reduced content of 1 molecule of $NH_3$. The product yields copper phthalocyanine on heating with copper acetate in formamide. No dyestuff formation is effected in glycol.

Example 54

128 parts of phthalonitrile are introduced at 30° C. with cooling into a solution of
23 parts of sodium in
101 parts of methanol diluted with
562 parts of benzene.

A deep yellow solution is formed within a short time from which, while the solution is gradually lightening, after 1–2 hours' stirring large glittering crystals begin to precipitate. Stirring is then continued for 24 hours and the crystals are sucked off and washed with benzene and ligroin.

110 parts of weakly yellow colored crystals are obtained which are supposed to be the sodium salt of a dimolecular isoindolenine derivative. On dissolving these crystals at 10° C. in 240 parts of methanol an almost colorless substance decomposing at 141–143° C. precipitates on treatment with a large quantity of ice water under hydrolysis of the sodium salt. The substance is slightly soluble in methanol but readily dissolves in methyl-alcoholic sodium hydroxide solution or in pyridine with weakly yellow coloration. The pyridine solution mixed with some methanol and diluted sodium hydroxide solution yields with a slight quantity of sodium hydrosulfite a deep reddish blue leuco compound which when heated with a large quantity of sodium hydrosulfite is converted into a colorless compound crystallizing in small needles.

The conversion of the weakly yellow sodium salt of the dimolecular isoindolenine derivative into the metal-free compound may also be effected by neutralization of the acetone solution of the sodium salt with glacial acetic acid whereby almost colorless needles decomposing at 141° C. are obtained.

Example 55

In a nitrogen atmosphere:

170 parts of a solution of
6 parts of sodium in
74.3 parts of methanol are added by dropping to a suspension of
128 parts of phthalonitrile in
527 parts of benzene at 20° C.

The solution is stirred for about 45 hours while passing over nitrogen and adding more benzene by degrees. Thereby the methanol slowly volatilizes from the solution and a brown yellow colored product precipitates.

After sucking off, washing with benzene and ligroin and drying in vacuo about 102 parts of the yellow sodium compound are obtained. On diluting the benzene mother liquor with ligroin about further 32 parts of the deep yellow phthalocyanine-free condensed sodium compound precipitate. According to elementary analysis the latter has the composition corresponding to the following formula:

$$C_{53}H_{42}N_{12}Na_2$$

The yellow sodium compound is insoluble in benzene but dissolves in a mixture of benzene and methanol with deep yellow coloration. On diluting the concentrated, alkali-containing alcoholic solutions with alcohols or water the deep yellow sodium compounds are readily subject to alcoholysis or hydrolysis whereby the solutions are of a lighter yellow color, or a yellow colored precipitate deposits. In alcoholic-aqueous solution by adding sodium hydrosulfite they form a deep blue, difficultly soluble leuco compound which can be reoxidized in air to the yellow colored alkali salt. In pyridine water the blue leuco compound is soluble with deep reddish blue coloration.

Example 56

2.9 parts of metallic sodium are dissolved in
50.6 parts of methanol. The methylate solution thus formed is diluted with
281 parts of benzene and
64 parts of phthalonitrile are added at 20° C. The solution is stirred for 20 hours at 20° C.
7.7 parts of glacial acetic acid are slowly added, the solution is further stirred for some time and the residue consisting mainly of sodium acetate and some phthalocyanine is sucked off. The benzene filtrate is reduced in vacuo to a small volume and the condensed methoxy imino-isoindolenine is precipitated with ligroin. The precipitate is sucked off, washed with ligroin and dried in vacuo.

Yield: about 60.3 parts of methoxy imino-isoindolenine, that is 81% of theory.

Example 57

2.9 parts of metallic sodium are dissolved in
50 parts of methanol. The methylate solution formed is diluted with
314 parts of pyridine,
64 parts of phthalonitrile are introduced while stirring at 20° C. Thereupon the solution is heated for one hour to 60° C., then cooled to 10° C. and
7.7 parts of glacial acetic acid are slowly added. The solution is still stirred for some time, sucked off from the precipitated sodium acetate, washed with pyridine and the pyridine filtrate is added to a mixture of
1000 parts of saturated sodium acetate solution and
4000 parts of water. The precipitate is sucked off, washed with water and dried in vacuo.

Yield: 58 parts of methoxy imino-isoindolenine corresponding to about 78% of theory.

Instead of pyridine also 298 parts of dimethyl formamide may be used. In this case, the procedure is followed as indicated in the foregoing example. After sucking off the sodium acetate the dimethyl formamide filtrate is precipitated with 5 per cent common salt solution. The precipitate is sucked off, washed with water and dried in vacuo. Yield: about 60.6 parts of methoxy imino-isoindolenine corresponding to 81.6% of theory.

Example 58

From a solution consisting of—

11.5 parts of sodium in
174 parts of methanol; so much methanol is distilled off in vacuo that a thick syrup remains. Then
527 parts of benzene are added and
192 parts of phthalonitrile are introduced whereby the temperature is not allowed to exceed 40° C.

After 24 hours' stirring carbon dioxide is introduced into the deep yellow solution until the solution does not become lighter any more. The solution is then sucked off from the precipitate and the condensed isoindolenine derivative is deposited with ligroin from the mother liquor which preferably has been somewhat reduced in vacuo to a smaller volume.

About 205 parts of a weakly yellowish colored product are obtained which dissolves in a mixture of sodium hydroxide solution, pyridine and alcohol, with deep yellow coloration and yields a deep blue leuco compound with sodium hydrosulfite whereby the formation of phthalocyanine is to be observed.

Example 59

5.75 parts of sodium are dissolved in
101 parts of methanol. Into the solution diluted with
596 parts of dimethyl formamide
128 parts of phthalonitrile are introduced at 20° C.

After stirring for 24 hours carbon dioxide is passed into the reaction mixture until the solution does not become lighter. It is then sucked off from the precipitate and the filtrate is diluted with water. The precipitate is sucked off, washed with water and dried in vacuo. Thus, 100 parts of a weakly yellow colored powder are obtained which yields a deep orange-yellow colored sodium salt in pyridine-methanol with sodium hydroxide solution and is characterized by an intensely blue leuco compound. By gently heating the alkaline solution containing pyridine with glucose metal-free phthalocyanine is formed.

Instead of benzene and dimethyl formamide also other solvents may be used, viz. toluene, tetrahydrofuran or pyridine.

The sodium methylate may be replaced by sodium ethylate, -propylate, -butylate, or -amylate, whereby the correspondingly substituted condensed imino-isoindolenine derivatives are obtained.

Example 60

In
90.6 parts of ethanol
6.9 parts of sodium are dissolved and the solution is diluted with
337 parts of benzene. Then
76.8 parts of phthalonitrile are introduced at 30° C. and the solution is stirred for 6 hours at 20–30° C. and for 2 hours at 40–45° C.

The precipitate is filtered off, washed with benzene and ligroin, stirred with some acetone, sucked off and filled up with acetone. After drying in vacuo 18 parts of weakly canary yellow needles are obtained the sodium compound of which yields in a methanol-water mixture with sodium hydrosulfite first a deep blue solution which, however, quickly fades with excess sodium hydrosulfite giving colorless crystals.

Carbon dioxide is introduced into the benzene mother solution, the precipitate is filtered off and the condensed ethoxy imino-isoindolenine is precipitated with ligroin. After sucking off the precipitate, washing with ligroin and drying in vacuo 41 parts of an almost colorless product are obtained which in methanol with sodium hydroxide solution yields a deep yellow sodium salt and which is distinguished by a more stable blue leuco compound difficultly soluble in methanol-water.

When using 3.4-dicyano diphenyl instead of phthalonitrile phenyl derivatives of the condensed ethoxy imino-isoindolenine derivatives are obtained displaying similar properties as the above described substances. Compared with the phenyl-free substances the color of the leuco compounds of phenyl derivatives has changed to green.

Example 61

104 parts of 3.4-dicyano diphenyl are introduced at 20° C. into the solution of
2.9 parts of sodium in
50 parts of methanol diluted with 281 parts of benzene and the solution is stirred for 24 hours at 20° C. The solution is then filtered from a slight turbidity, the benzene filterate is concentrated in vacuo and the condensed methoxy imino-isoindolenine containing phenyl groups is precipitated with ligroin.

After sucking off, washing with ligroin and drying in vacuo 123 parts of a sodium-containing, orange colored powder is obtained which is difficultly soluble in alcoholic solutions. In pyridine the reaction product yields a deep yellow solution which with aqueous sodium hydrosulfite and sodium hydroxide solution forms a greenish blue leuco compound.

When replacing the benzene by dimethyl formamide, pyridine or dioxane, precipitating the filtered solutions with water, sucking off, washing with water and drying in vacuo, 11.3–12.1 parts each of a full, clay yellow colored powder is obtained which is soluble in o-dichlorobenzene with deep brownish yellow coloration and turns on heating to a brown-yellow, difficultly soluble compound. When adding cuprous bromide to the hot o-dichlorobenzene solution tetraphenyl-copper phthalocyanine is very readily obtained.

*Example 62*

20 parts of phthalonitrile are heated with stirring to 65° C. with
10 parts of anhydrous copper nitrate in
140 parts of pyridine.

Before the reactants go into solution a weakly colored, purely crystalline precipitate begins to form and the reaction mixture becomes rather viscous after 7 hours. Heating is continued for totally 17 hours and then the very difficultly soluble warm reaction product is sucked off. The filtration residue is repeatedly washed with pyridine, methanol and hot water until the filtrate becomes colorless and then the residue is dried. The weakly grey colored compound obtained in good yield contains copper as well as small traces of copper phthalocyanine. The reaction product is difficultly soluble in organic solvents. On heating in pyridine, quinoline or aniline the compound yields copper phthalocyanine which is also formed by reduction, for instance, in formic acid with ferrosulfate. By treating with acetone and hydrochloric acid the new compound is converted into a colorless, readily crystallizable substance which is very easily soluble in methanol and which is converted in aniline or on vatting into copper phtalocyanine already at room temperature. According to elementary analysis the substance treated with nitric acid and acetone has the following composition:

$$C_{51}H_{39}N_{15}O_9Cu$$

probably contains two nitrate residues.

*Example 63*

By stirring 77 parts of phthalonitrile and
56 parts of anhydrous copper nitrate into
600 parts of nitrobenzene at 95° C., a yellow compound crystallizes out of the yellow solution after some time which is filtered off after a reaction time of 7 hours, washed with nitrobenzene, methanol and hot water and dried. 85 parts of brass yellow crystals are obtained which are almost insoluble in organc solvents. The compound contains 14.8% of copper.

*Example 63a*

By reacting 128 parts of phthalonitrile and
75 parts of dehydrated copper acetate in
1200 parts of nitrobenzene for some hours at 95–100° C. the initally bluish color of the melt changes to weakly olive green and after about 90 minutes colorless to weakly grey colored small needles precipitate. Furthermore, if the reaction time is too long the formation of copper phthalocyanine can be observed. Therefore, the reaction has to be stopped in due course. The reaction product is isolated by sucking off and washing.

The weakly grey colored substance is insoluble in pyridine, methanol and in pyridine-sodium-hydroxide-mixtures. By treating with acetone and hydrochloric acid the product is converted into a compound which yields deep blue solutions with sodium hydrosulfite in an alkaline medium.

*Example 64*

A mixture of—

30 parts of phthalonitrile,
12 parts of cuprous bromide and
240 parts of pyridine is heated in an open flask for about 15 hours at 65° C. The initially brown pyridine solution has now taken a yellow coloration. After cooling the melt is diluted with
100 parts of pyridine and filtered from the precipitate.

By diluting the yellow filtrate with ice water weakly yellow colored flakes precipitate from the pyridine solution which are sucked off and washed with water. Drying is performed in an exsiccator. The crude product may be purified with nitric acid. The product dissolves in methanol with yellow coloration which turns to orange brown by adding sodium hydroxide solution and after adding hydrosulfite and diluting with water yields a clear green solution, purely blue flakes of the copper phthalocyanine soon precipitating therefrom. Also on gently warming in butanol sodium hydroxide solution or on dry heating the formation of copper phthalocyanine can be observed.

*Example 65*

385 parts of pyridine,
81.6 parts of 3.4-dicyano diphenyl and
28.6 parts of cuprous bromide are stirred for 24 hours at 65–70° C. The 4.4'.4''.4'''-tetraphenyl copper phthalocyanine thus formed is sucked off and washed with pyridine.

After boiling off the filtration residue with diluted hydrochloric acid about 39.5 parts of the tetraphenyl copper phthalocyanine are obtained. The pyridine mother solutions are diluted with water, the precipitate is sucked off, washed with water and dried in vacuo.

About 58 parts of a weakly yellow colored product are obtained which is readily reconverted into the 4.4'.4''.4'''-tetraphenyl copper phthalocyanine with reducing agents, such as sodium hydrosulfite or glucose. The intermediate product is easily soluble in pyridine with yellow coloration.

*Example 66*

14.5 parts of amino-imino-isoindolenine (obtained according to copending application Ser No.

180,696 of even date relating to "New Intermediate Products") are dissolved in
400 parts of pyridine at 60° C. Into this solution cooled to 40° C. a solution of
10 parts of cuprous chloride in
300 parts of pyridine prepared at 80° C. and cooled to 40° C. is introduced.

A red brown product precipitates from the solution. After stirring over night at room temperature the reaction product is sucked off and washed with pyridine and ether. The red brown compound thus obtained contains the elements: C, H, O, N, Cl, Cu in the ratio 8.7:8.6:6.4:3:0.8:0.9.

On heating with excess amino-imino-isoindolenine in formamide or glycol copper phthalocyanine is obtained. Sodium hydrosulfite reduces the copper to metal.

Example 67

145 parts of amino-imino-isoindolenine (cf. Example 9) are introduced at 25° C. with stirring into a solution of
171 parts of copper chloride (cryst.) in
1350 parts of methanol, a green crystalline precipitate being formed thereby. The precipitate is sucked off and washed with methanol and ether. The green copper salt has the following composition.

C = 38.00%
H = 3.30%
O = 3.36%
N = 15.70%
Cl = 21.50%
Cu = 19.00%

On heating with excess amino-imino-isoindolenine in formamide or glycol copper phthalocyanine is obtained already at about 100° C. Sodium hydrosulfite reduces the copper to metal.

Example 68

8.7 parts of amino-imino-isoindolenine (cf. Example 9) are dissolved in
86 parts of cold methanol and a solution of
5.1 parts of copper chloride (cryst.) in
40 parts of methanol is added with stirring at room temperature.

A violet grey, crystalline precipitate is formed which is sucked off and washed with methanol and ether. The yield amounts to 13.5 parts of a violet grey copper compound containing the elements: C, H, O, N, Cl, Cu in the ratio

17:21.8:1.0:6.2:2:1

On heating with excess amino-imino-isoindolenine in formamide or glycol copper phthalocyanine is formed therefrom already at about 100° C. Sodium hydrosulfite reduces the copper to metal.

Example 69

29 parts of amino-imino-isoindolenine (cf. Example 9) are dissolved in
230 parts of methanol at room temperature. A solution of
23.8 parts of nickel chloride (cryst.) in
190 parts of methanol is added with stirring.

A clear, yellow solution is initially obtained, then a yellow precipitate is formed which becomes crystalline after stirring for about one hour. The reaction product is then sucked off and washed with methanol and ether.

The yellow nickel compound dissolves in formamide first with yellow coloration, on heating grey needles precipitate which on further heating are converted into nickel phthalocyanine. Sodium hydrosulfite reduces the nickel to metal.

Example 70

29 parts of amino-imino-isoindolenine (cf. Example 9) are dissolved in
230 parts of methanol at room temperature. A solution of
23.8 parts of cobalt chloride (cryst.) in
190 parts of methanol is added with stirring. A red brown solution is initially obtained, then a red brown precipitate is formed which becomes crystalline on standing for a longer time. After half an hour the reaction product is sucked off, washed with methanol and dried.

On heating the cobalt compound in formamide cobalt phthalocyanine is formed.

On heating the compound together with excess amino-imino-isoindolenine in formamide or glycol the dyestuff is obtained already at about 100° C. Sodium hydrosulfite reduces the cobalt to metal.

Example 71

A mixture of—

19.4 parts of amino-imino-isoindolenine (cf. Example 9),
3.44 parts of copper chloride (cryst.) and
180 parts of pyridine is stirred for 8 hours at room temperature, the violet grey needles thus formed are sucked off and washed with pyridine, acetone and ether. The violet grey compound obtained in this manner contains the elements: C, H, O, N, Cl, Cu in the ratio 31.5:37.6:2.6:11.3:2.4:1.

On heating the substance alone or with excess amino-imino-isoindolenine in formamide or glycol copper phthalocyanine is obtained already at about 100° C.

Sodium hydrosulfite reduces the copper to metal.

Example 72

2.3 parts of sodium are dissolved in
80 parts of anhydrous ethanol.
14.5 parts of amino-imino-isoindolenine (cf. Example 9) and
12.8 parts of phthalonitrile are added at room temperature with stirring. The yellow solution is stirred for about 20 hours. Then
8.5 parts of copper chloride (cryst.) are added.

After stirring for 4 hours whereby ammonia escapes the light green precipitate is sucked off and washed with ethanol and ether. The yield amounts to 11.5 parts of the light green copper compound having the following composition:

C = 44.34%
H = 3.40%
O = 5.53%
N = 15.14%
Cl = 17.58%
Cu = 14.00%

The light green precipitate dissolves in concentrated sulfuric acid with olive coloration. On pouring said solution into water blue flakes consisting of copper phthalocyanine precipitate.

In formic acid the copper compound yields an initially orange colored solution from which with the changing of the coloration over red, violet to blue, copper phthalocyanine precipitates.

Also on heating in glycol copper phthalocyanine is obtained, more readily after the addition of some formaldehyde bisulfite.

Example 73

19.4 parts of amino-imino-isoindolenine (cf. Example 9) and
3.4 parts of copper chloride (cryst.) are added to
180 parts of pyridine at 100° C. with stirring for one hour, a yellow brown solution being obtained thereby.

The solution is then stirred for a further 45 minutes at 117° C. The solution decolorizes, ammonia escapes and grey needles precipitate. The hot solution is filtered and washed with pyridine and ether. The substance dissolves in concentrated sulfuric acid with greenish yellow coloration.

On pouring the solution into water blue flakes consisting of copper phthalocyanine precipitate.

In cold formic acid the grey substance dissolves almost colorless, on heating the solution changes to orange, finally to violet and copper phthalocyanine precipitates on boiling. In glacial acetic acid a yellow solution is obtained wherein copper phthalocyanine precipitates on boiling. In alcohol-pyridine or in pyridine-water-mixtures sodium hydrosulfite or sodium sulfide give a deep blue solution from which copper phthalocyanine precipitates.

On boiling in nitrobenzene ammonia escapes and copper phthalocyanine precipitates. The substance is insoluble in boiling pyridine.

When replacing copper chloride by copper acetate a grey substance with very similar properties and having the following composition is obtained:

$C = 67.40\%$
$H = 3.01\%$
$O = 2.96\%$
$N = 18.90\%$
$Cl = 0.10\%$
$Cu = 7.00\%$

According to analysis and in view of its behavior in solvents the reaction complex is probably a complex containing a closed ring of 6-imino-isoindol- or imino-isoindolenine-molecules.

Example 74

19.4 parts of amino-imino-isoindolenine (cf. Example 9) and 4.8 parts of cobalt chloride (cryst.) are added to
180 parts of pyridine and first stirred for one hour at room temperature, a red brown amorphous precipitate being formed thereby.

The solution is stirred for another hour at 70° C. and for 3 hours at 117° C. At temperatures above 90° C. ammonia escapes and the amorphous precipitate is converted into little needles which gradually change to yellow brown rhombs. These rhombs are sucked off after cooling and washed with some pyridine, water and hot alcohol and ether. By elementary analysis of the yellow brown cobalt complex the following values were ascertained:

$C = 68.60\%$
$H = 3.80\%$
$O = 0.44\%$
$Cl = 0.25\%$
$N = 19.91\%$
$Co = 7.20\%$

The yellow brown cobalt complex dissolves in concentrated sulfuric acid with olive green coloration. On pouring said solution into water blue flakes of cobalt phthalocyanine precipitate. In formic acid the cobalt compound yields a yellow solution at room temperature which on heating changes to green and from which on boiling also cobalt phthalocyanine precipitates. Also on heating with formamide or glycol cobalt phthalocyanine is formed. In mixtures of pyridine and water an olive green solution is obtained with sodium hydrosulfite or sodium sulfide. From this solution cobalt phthalocyanine precipitates by introducing atmospheric oxygen.

On concentrating the alcohol filtrate obtained by washing out the above-described cobalt complex, another yellow, crystalline cobalt complex is obtained displaying very similar properties as the former, however, being soluble in boiling methanol and pyridine.

Example 75

19.4 parts of amino-imino-isoindolenine (cf. Example 9) and
4.76 parts of nickel chloride (cryst.) are introduced into
180 parts of pyridine with stirring for 2 hours at 100° C.

A red solution is initially obtained from which red brown needles precipitate, ammonia escaping thereby. The solution is stirred for another hour at 117° C. The red brown needles are converted thereby into short prisms. The latter are filtered from the hot solution and washed with pyridine and ether. The substance dissolves in concentrated sulfuric acid with olive green coloration. On pouring said solution into water blue flakes of nickel phthalocyanine precipitate.

In cold formic acid the nickel compound yields a blue red solution which soon takes a violet color, nickel phthalocyanine precipitating therefrom on boiling. On heating in formamide or glycol nickel phthalocyanine is also obtained.

Nickel phthalocyanine is likewise formed on boiling the nickel compound with sodium hydrosulfite in pyridine-water mixtures.

Example 76

A solution of
26.4 parts of anhydrous copper chloride in
100 parts of methanol is slowly introduced into a solution of
32 parts of the dimolecular methoxy imino-isoindolenine (obtained according to Example 54) in 200 parts of methanol and
38.4 parts of sodium methylate solution (6 parts of sodium in 79 parts of methanol).

A yellow-green precipitate is formed in good yield which is sucked off, washed with methanol and dried in vacuo. The product is very difficultly soluble in organic solvents but readily dissolves in a mixture of pyridine in methanol with yellow brown coloration by the addition of sodium hydroxide solution. On heating this solution with an invert sugar solution beautiful brown yellow crystals precipitate. The yellow-green as well as the brown-yellow copper compound readily yield copper phthalocyanine on heating with formamide.

Example 77

In a nitrogen atmosphere there are added drop by drop—

34 parts of sodium methylate solution (6 parts of sodium in 79 parts of methanol) to a suspension of
25.6 parts of phthalonitrile in
105.5 parts of benzene at 20–30° C. The mixture is heated for one hour to about 35° C.

while stirring. Thereupon, at 20° to 22° C., a solution of 6.7 parts of anhydrous copper chloride in
15.8 parts of methanol is introduced whereby a temperature rise by about 15° C. takes place.

After 3 hours' stirring the precipitated sodium chloride is sucked off. The benzene filtrate is concentrated in vacuo and reacted with ligroin whereby a brown sticky precipitate is formed. The latter is dissolved in 0.9 part of tetrahydrofuran and stirred into
3.5 parts of ligroin; the precipitate formed is sucked off, washed with ligroin and dried in vacuo. The yield amounts to about 26 parts.

The dried product is a weakly yellowish-brown powder soluble in methanol. On adding sodium hydroxide solution or water to the methyl alcoholic solution a light, flocculent precipitate is formed. In a pyridine solution of sodium hydrosulfite the copper compound is readily converted into copper phthalocyanine by moderately heating.

On gently heating with piperidine phthalocyanine ring-closure occurs. The copper compound dissolves in formic acid with olive yellow coloration which on heating becomes initially brown yellow and later on violet. Finally some copper phthalocyanine precipitates from the solution.

Example 78

A mixture of—

105.5 parts of benzene,
25.6 parts of phthalonitrile and
22.7 parts of sodium methylate solution (6 parts of sodium in 100 parts of methanol) is heated for about 15 minutes to 35° C. until the intensity of the yellow solution is not further increased. Thereupon 6 parts of finely sifted copper acetate are introduced at 20° C.

The mixture is stirred for 90 minutes at 20° C. and sucked off from the precipitated sodium acetate. The benzene filtrate concentrated in vacuo is reacted with ligroin and left standing until the precipate has become solid. The reaction product is then sucked off and washed with ligroin. After drying in vacuo 27.3 parts of a weakly brownish yellow colored powder is obtained which very readily yields copper phthalocyanine in a pyridine-containing, alkaline solution of sodium hydrosulfite.

Example 79

2.9 parts of sodium are dissolved in
51 parts of methanol. After diluting with
314 parts of pyridine
64 parts of phthalonitrile are introduced. The solution is heated for one hour to 60° C. and, after cooling to 20° C.,
23 parts of finely powdered basic copper acetate are added.

After one hour the copper compound is precipitated from the brown solution with water. The compound is sucked off, washed with water and dried in vacuo. 65.5 parts of a brownish yellow powder (copper content 8.0%) are obtained which is difficulty soluble in formamide and readily soluble in dimethyl formamide, pyridine or dioxane. On heating with formamide, glycol or nitrobenzene copper phthalocyanine is formed.

Example 80

A solution of—

2.9 parts of metallic sodium in
51 parts of methanol is diluted with
314 parts of pyridine.
64 parts of phthalonitrile are introduced at 20–30° C. and the mixture is then heated at 60° C. for one hour. The solution is cooled to 20° C. and
29.7 parts of crystalline nickel chloride are added.

The mixture is then stirred at 20° C. for one hour, and the precipitated salt is sucked off and washed with pyridine. The pyridine filtrate is precipitated with water, the precipitate is sucked off, washed with water and dried in vacuo. 64.5 parts of a brownish red powder (nickel content 6.0%) are obtained which is slightly soluble in methanol and dissolves in chloroform, pyridine and dimethyl formamide with brownish orange coloration. With sodium hydrosulfite or on heating with formamide, glycol or trichlorobenzene, nickel phthalocyanine is readily obtained.

Example 81

64 parts of phthalonitrile are added to a solution of
2.9 parts of metallic sodium in
51 parts of methanol diluted with
281 parts of benzene. The solution is stirred for 24 hours at 20° C.,
16.25 parts of dehydrated cobalt chloride are added and the mixture is stirred for another hour at 20° C.

Thereby 62 parts of a precipitate are formed consisting mainly of cobalt phthalocyanine which is sucked off and washed with benzene.

The benzene filtrate is concentrated in vacuo and treated with ligroin. After sucking off and washing with ligroin and drying the precipate in vacuo 19 parts of a brownish yellow powder are obtained which is soluble in methanol with brown yellow coloration and yields a leuco compound with alkaline hydrosulfite. Its solution in formic acid is brownish yellow colored and changes on shortly heating to a dirty green color.

Example 82

3.45 parts of metallic sodium are dissolved in methanol. The greater part of the excess methanol is distilled off in vacuo until a thick syrup is obtained. After diluting with
253 parts of benzene
57.6 parts of phthalonitrile are introduced at 20–25° C. and the solution is stirred for one hour at 25° C. Then
10.05 parts of dehydrated copper chloride are added whereby first no reaction can be observed. Then
38.25 parts of piperidine are added, the temperature being kept at 25–30° C. by outside cooling.

After stirring for 24 hours the precipitated weakly yellow colored coarse needles are sucked off and washed with benzene and ligroin. After drying in vacuo an almost colorless crystal powder is obtained which is insoluble in dilute sodium hydroxide solution and organic solvents. In dilute aqueous acids the reaction product dissolves with partial decomposition and partial formation of copper phthalocyanine. In cold concentrated sulfuric acid it dissolves with the color of the copper phthalocyanine. On pouring the solution into water pure copper phthalocyanine precipitates. In formic acid the copper compound dissolves with brownish red coloration. On heating the solution initially changes to violet, then copper phthalocyanine precipitates.

*Example 83*

5 parts of a 95% nitric acid are added to a suspension of
10 parts of copper phthalocyanine in
100 parts of glacial acetic acid and stirred for about 30 minutes at 20–25° C.

The violet mixture is then sucked off, the residue is stirred with ice-cold 20% ammonia and sucked off again. The dry filter cake obtained is then extracted with benzene at room temperature, the reaction product being dissolved thereby. The product can be isolated by precipitating with ligroin or by cautiously reducing the benzene solution to a smaller volume after separating the undissolved ingredients. A weakly yellow compound is thus obtained which changes to olive in sunlight. By heating this compound in aniline or by treating it with reducing agents copper phthalocyanine is formed.

*Example 84*

10 parts of copper phthalocyanine are introduced into a mixture of
60 parts of toluene and
3 parts of concentrated nitric acid. The mixture is stirred for about 30 minutes at room temperature and is then sucked off in a suction filter of glass, the filtration residue is pasted up with about
60 parts of benzene and ammonia gas is introduced into the benzene suspension for some time.

On processing in this way, the product dissolves with yellow brown coloration and is isolated in vacuo after previously filtering by distilling off the benzene.

The product is identical with the substance obtainable according to Example 83.

*Example 85*

5 parts of copper phthalocyanine are introduced while cooling into a mixture of 0° C. consisting of
16 parts of methanol and
52 parts of nitric acid (specific gravity=1.5). Further
20 parts of nitric acid are added in order to dissolve the dyestuff completely.

The solution which is weakly brown colored is immediately poured into an ice-common-salt-mixture, the light grey precipitate is sucked off and pasted up with cold ammonia water. The reaction product, however, may also be rendered ammoniacal before sucking off. The ammoniacal paste is weakly yellow colored and is dried in the exsiccator after washing with cold water.

*Example 86*

45 parts of nitric acid are added by dropping at a temperature below 10° C. to a mixture of
10 parts of methanol and
7.5 parts of pyridine.
5 parts of copper phthalocyanine are added at about 5° C.

By adding a further quantity of about 15 parts of nitric acid the starting product is completely dissolved with orange yellow coloration. The solution is poured into ice and excess ammonia and the weakly colored precipitate is sucked off and dried at room temperature after washing with water. The compound is identical with the product obtainable according to Example 85. The yield amounts of 4 parts. The substance is hardly soluble in ether and methanol, however, dissolves in acetone, pyridine and nitrobenzene with yellow brown coloration. By adding sodium hydroxide to a pyridine-methanol mixture the solution shows no change of color for the moment, however, becomes soon lighter. Copper phthalocyanine is obtained by heating the reaction product in nitrobenzene and a trace of piperidine or by reduction. The solution in formic acid is yellow brown colored.

*Example 87*

45.6 parts of cobalt phthalocyanine are added in finely distributed form with stirring to
300 parts of nitrobenzene, and a mixture of
12 parts of 95% nitric acid and
50 parts of nitrobenzene is introduced at room temperature.

The temperature rises to 25–30° C. and the reaction is stopped as soon as the starting material has been converted into uniformly black brown needles. The reaction product is sucked off and washed with nitrobenzene, benzene and methanol. After drying in air 60 parts of the dark brown compound are formed. By heating in formic acid the blue cobalt phthalocyanine is obtained therefrom over a violet intermediate stage.

On pasting up the washed black brown substance with methanol and adding some sodium hydroxide solution the greater part is dissolved with green blue coloration. By adding more sodium hydroxide to the filtered solution beautiful blue prisms are obtained. The isolated blue compound is readily soluble in cold methanol with clear blue green coloration. The solution in cold piperidine changes to more blue on heating. The solution in sulfuric acid is olive green and yields greenish, dull blue flakes on pouring the solution into water.

On treating cobalt phthalocyanine with nitric acid as described above, however, while using a larger quantity of acid, the reaction proceeds further and lemon yellow small needles are formed instead of the black brown crystals. The yellow compound may be prepared, for instance, in the following manner:

22.8 parts of cobalt phthalocyanine are introduced into
140 parts of nitrobenzene. After cooling to 10–15° C.
56 parts of nitric acid having a specific gravity of 1.4 are added by dropping, the temperature rising thereby to about 20° C.

The mixture takes first a black brown coloration and gradually becomes lighter on stirring at room temperature. Towards the end of the reaction uniform, yellow needles can be observed with the microscope. When a test portion does no longer dissolve in a mixture of methanol and caustic soda solution with blue green coloration but with orange brown coloration about 320 parts of methanol are added to the inhomogeneous reaction mixture and the reaction product is sucked off. The yellow filter cake obtained is thoroughly washed with methanol and finally treated with acetone and ether several times. The yield amounts to 27 parts of a compound containing oxygen and cobalt.

According to analysis the compound has the following composition:

C =49.6%
O =16.6%
H = 3.7%
N =17.0%
Co= 7.1%

Whereas the cobalt compound is insoluble in cold nitrobenzene it is easily soluble in pyridine and quinoline with orange brown coloration. The brown aqueous alkaline solution gives an olive colored vat precipitating a clear blue dyestuff on agitating with air.

*Example 88*

10 parts of finely powdered copper phthalocyanine are added to a solution of
170 parts of methanol and
30 parts of bromine.

The solution is stirred at room temperature until the dyestuff has been dissolved except a small residue. On evaporating a test portion of the clarified solution, uniform yellow small crystals can be observed with the microscope. As the substance in this state is not very stable 10 parts of pyridine are added after filtration and the reaction mixture is further heated for about 15 minutes to the boil. Yellow brown crystals are obtained which are sucked off after cooling. The filter cake is washed with methanol and ether and then dried. The brownish yellow crystal powder contains 28.8% of loosely bound bromine. The substance containing bromine dissolves in sulfuric acid in a similar way as copper phthalocyanine. By heating in pyridine wherein the compound is easily soluble or in aniline copper phthalocyanine is reformed. The starting material is also formed again by the reduction with hydroquinone, for instance, in glacial acetic acid.

On pasting up the bromine compound with 22 parts of benzene and introducing ammonia gas at room temperature the substance dissolves with orange coloration. The mixture is then filtered off from the inorganic salts and the new compound is cautiously precipitated with ether. Orange yellow crystals are obtained which are free from halogen. They are soluble in cold pyridine and are precipitated again therefrom in a finely crystalline form by adding water. By heating in aniline to about 100° C. copper phthalocyanine is obtained in good yield. On adding hydroquinone to the golden yellow solution in sulfuric acid blue dyestuff flakes are obtained by pouring the solution into water.

*Example 89*

500 parts of methanol,
90 parts of bromine,
30 parts of pyridine and
30 parts of copper phthalocyanine are heated with stirring for about 15 minutes to the boil. The greater part of the mixture thus obtained goes temporarily into solution from which orange brown crystals very rapidly precipitate. These crystals are sucked off and washed with methanol and ether. 42 parts of bromine compound are obtained which is identical with the bromine derivative prepared according to Example 88. The compound is converted into the above described bromine-free compound by treatment with ammonia. According to elementary analysis the latter compound exhibits the following composition:

C =63.2%
O = 5.0%
H = 3.7%
N =17.8%
Cu= 9.5%

*Example 90*

A mixture of—
5.8 parts of 1-amino-3-imino-isoindolenine (cf. Example 9),
4.16 parts of 1-amino-3-imino-isoindolenine nitrate and
1.6 parts of anhydrous cobalt chloride in
19.2 parts of nitrobenzene is heated with stirring at 180° C. for 4 to 5 hours.

After cooling the solution is diluted with methanol. The yellow brown crystals obtained are sucked off, washed with methanol and water and dried. 6.7 parts of cobalt phthalocyanine intermediate are obtained.

*Example 91*

A mixture of—
6.96 parts of a complex cobalt amino-imino-isoindolenine compound containing per 1 atom of cobalt 4 molecules of imino-isoindolenine and one or more nitrate radicals (obtained according to Example 87),
3.2 parts of 1-amino-3-imino-isoindolenine (cf. Example 9) and
60 parts of nitrobenzene is heated at 180° C. to 190° C. until the initially formed blue crystals of the cobalt phthalocyanine have redissolved. After cooling and diluting the solution with methanol yellow brown crystals precipitate. The crystals are washed and dried. 2.4 parts of a cobalt phthalocyanine intermediate difficultly soluble in nitrobenzene are thus obtained. The product temporarily dissolves in acetone with sodium methylate, however, can be precipitated as sodium compound in form of red brown crystals by adding excess sodium methylate.

According to elementary analysis the following values were found:

C=61.17%
H= 3.07%
N=22.17%
O= 5.07%
Co= 7.50%

By concentrating in vacuo the nitrobenzene-methanol-mother liquors obtained as described above, reacting the residue with ligroin, sucking off, washing the yellow brown precipitate with ligroin and drying 5.3 parts of a cobalt phthalocyanine intermediate being easily soluble in nitrobenzene are obtained.

According to elementary analysis the intermediate product shows the following composition:

FOUND

C=60.50%
H= 3.62%
N=19.19%
O=10.23%
Co= 6.00%

*Example 92*

60 parts of nitrobenzene,
5.71 parts of cobalt phthalocyanine and
4.44 parts of 1-amino-3-imino-isoindolenine nitrate (cf. Example 9)

are heated at 200° to 210° C. for 2 to 3 hours until the blue needles of cobalt phthalocyanine have gone into solution. After cooling the solution is sucked off, the precipitate formed is washed with acetone and ligroin. 6.25 parts of a slightly soluble cobalt phthalocyanine intermediate are obtained.

By concentrating the nitrobenzene mother liquor in vacuo and precipitating with ligroin, sucking off, washing the precipitate with ligroin and drying 2.7 parts of a cobalt phthalocyanine intermediate being easily soluble in nitrobenzene are obtained.

We claim:

1. A composition of matter comprising a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines and a normally liquid to solid reducing agent.

2. A composition of matter comprising a monomeric 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines and a normally liquid to solid reducing agent.

3. A composition of matter comprising an intermolecular polycondensate of a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines and a normally liquid to solid reducing agent.

4. A composition of matter comprising an intermolecular polycondensate of a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, said 3-imino-isoindolenine containing a heavy metal being capable of forming metal phthalocyanines, a water-miscible organic solvent for said 3-imino-isoindolenine, water and a normally liquid to solid reducing agent.

5. A composition of matter comprising a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a thickening substance, a heavy metal compound being capable of forming metal phthalocyanines and a normally liquid to solid reducing agent.

6. A composition of matter comprising a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a thickening substance, a heavy metal compound being capable of forming metal phthalocyanines, at least one substance selected from the group consisting of ammonia, secondary alkyl amines, tertiary alkyl amines, secondary alkanol amines, tertiary alkanol amines, acylamides and a normally liquid to solid reducing agent.

7. A composition of matter comprising a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a thickening substance, a heavy metal compound being capable of forming metal phthalocyanines, at least one substance selected from the group consisting of ammonia, secondary alkyl amines, tertiary alkyl amines, secondary alkanol amines, tertiary alkanol amines, acylamides and a normally liquid to solid reducing agent.

8. A composition of matter comprising 1-amino-3-imino-isoindolenine, a water-miscible organic solvent for said 1-amino-3-imino-isoindolenine, water, a thickening substance, at least one substance selected from the group consisting of ammonia, secondary alkyl amines, tertiary alkyl amines, secondary alkanol amines, tertiary alkanol amines, acylamides and a normally liquid to solid reducing agent.

9. A composition of matter comprising 1-amino-3-imino-isoindolenine, copper chloride, formamide, ethylene glycol, a tragacanth thickening, water, and triisopropanol amine.

10. A process for decorating textile fibers which comprises treating textile fibers with a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines and a normally liquid to solid reducing agent and subjecting the textile fibers thus treated to a heat treatment.

11. A process for decorating textile fibers which comprises treating textile fibers with a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines and a normally liquid to solid reducing agent and subjecting the textile fibers thus treated to a steam treatment.

12. A process for decorating textile fibers which comprises treating textile fibers with a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines and a normally liquid to solid reducing agent and subjecting the textile fibers thus treated to an acid steam treatment.

13. A process for decorating textile fibers which comprises treating textile fibers with a monomeric 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines and a normally liquid to solid reducing agent and subjecting the textile fibers thus treated to a heat treatment.

14. A process for decorating textile fibers which comprises treating textile fibers with an intermolecular polycondensate of a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines and a normally liquid to solid reducing agent and subjecting the textile fibers thus treated to a heat treatment.

15. A process for decorating textile fibers which comprises treating textile fibers with an intermolecular polycondensate of a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, said 3-imino-isoindolenine containing a heavy metal being capable of forming metal phthalocyanines, a water-miscible organic solvent for said 3-imino-isoindolenine, water and a normally liquid to solid reducing agent, and subjecting the textile fibers thus treated to a heat treatment.

16. A process for decorating textile fibers which comprises printing textile fibers with a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a thickening substance, a heavy metal compound being capable of forming metal phthalocyanines and a normally liquid to solid reducing agent, and subjecting the textile fibers thus printed to a heat treatment.

17. A process for decorating textile fibers which comprises treating textile fibers with a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a heavy metal compound being capable of forming metal phthalocyanines, at least one substance selected from the group consisting of ammonia, secondary alkyl amines, tertiary alkyl amines, secondary alkanol amines, tertiary alkanol amines, acylamides and a normally liquid to solid reducing agent, and subjecting the textile fibers thus treated to a heat treatment.

18. A process for decorating textile fibers which comprises printing textile fibers with a 3-imino-isoindolenine carrying in 1-position a substituent, selected from the group consisting of amino, phenylamino, alkylamino and dialkylamino, whose alkyl groups contain at most 8 carbon atoms, and cycloalkylene imino, cycloalkyl amino and alkoxy, which contain at most 6 carbon atoms, a water-miscible organic solvent for said 3-imino-isoindolenine, water, a thickening substance, a heavy metal compound being capable of forming metal phthalocyanines, at least one substance selected from the group consisting of ammonia, secondary alkyl amines, tertiary alkyl amines, secondary alkanol amines, tertiary alkanol amines, acylamides and a normally liquid to solid reducing agent, and subjecting the textile fibers thus printed to a heat treatment.

19. A process for decorating textile fibers which comprises printing textile fibers with 1-amino-3-isoindolenine, a water-miscible organic solvent for said 1-amino-3-isoindolenine, water, a thickening substance, at least one substance selected from the group consisting of ammonia, secondary alkyl amines, tertiary alkyl amines, secondary alkanol amines, tertiary alkanol amines, acylamides, and a normally liquid to solid reducing agent, and subjecting the textile fibers thus printed to a heat treatment.

20. A process for decorating textile fibers which comprises printing textile fibers with 1-amino-3-imino-isoindolenine, copper chloride, formamide, ethylene glycol, a tragacanth thickening, water, and triisopropanol amine, and subjecting the textile fibers thus printed to a heat treatment.

References Cited in the file of this patent

UNITED STATES PATENTS

| Number | Name | Date |
|---|---|---|
| 2,025,791 | Thorpe et al. | Dec. 31, 1935 |
| 2,599,371 | Chadderton | June 3, 1952 |
| 2,613,128 | Baumann | Oct. 7, 1952 |